(12) United States Patent
Kitta et al.

(10) Patent No.: US 6,193,503 B1
(45) Date of Patent: Feb. 27, 2001

(54) ASH MELTING FURNACE AND ASH MELTING METHOD THEREOF

(75) Inventors: Takehiro Kitta; Masao Takuma; Hiroki Honda; Kimitoshi Ose; Tetsuo Sato; Izuru Ishikawa; Kenichi Shibata; Akira Noma, all of Yokohama (JP)

(73) Assignee: Mitsubishi Heavy Industries Ltd., Tokyo (JP)

( * ) Notice: Subject to any disclaimer, the term of this patent is extended or adjusted under 35 U.S.C. 154(b) by 0 days.

(21) Appl. No.: 09/424,063

(22) PCT Filed: Mar. 25, 1999

(86) PCT No.: PCT/JP99/01501

§ 371 Date: Mar. 28, 2000

§ 102(e) Date: Mar. 28, 2000

(87) PCT Pub. No.: WO99/50600

PCT Pub. Date: Oct. 7, 1999

(30) Foreign Application Priority Data

| Mar. 27, 1998 | (JP) | 10-100382 |
| Mar. 27, 1998 | (JP) | 10-100383 |
| Mar. 27, 1998 | (JP) | 10-100395 |
| Mar. 31, 1998 | (JP) | 10-103316 |
| Mar. 31, 1998 | (JP) | 10-103317 |

(51) Int. Cl.$^7$ ..................................... F27B 3/18
(52) U.S. Cl. .............................. 432/13; 432/161; 373/22; 266/230; 266/236
(58) Field of Search ................................. 432/13, 67, 71, 432/161; 373/18, 19, 22; 266/217, 218, 223, 236, 230, 231; 219/121.37; 110/246, 346

(56) References Cited

U.S. PATENT DOCUMENTS 5,320,050   6/1994   Ishida et al. .

5,493,578 * 2/1996 Fukusaki et al. .................. 373/18
5,495,948 * 3/1996 Ishida et al. ...................... 209/11
5,601,427 * 2/1997 Yuasa et al. ...................... 432/161

OTHER PUBLICATIONS

Derwent Abstract of Japanese Publication No. 11–287432, Published Oct. 19, 1999.

Derwent Abstract of Japanese Publication No. 11–281042, Published Oct. 15, 1999.

Derwent Abstract of Japanese Publication No. 11–287426, Published Oct. 19, 1999.

* cited by examiner

Primary Examiner—Denise L. Ferensic
Assistant Examiner—Gregory A. Wilson
(74) Attorney, Agent, or Firm—Evenson, McKeown, Edwards & Lenahan, P.L.L.C.

(57) ABSTRACT

The object of this invention is to provide an ash-melting furnace which can respond to fluctuations in the load and which will be capable of highly efficient and stable operation. In an ash-melting furnace which heats and melts the primary ash and the fly ash obtained by combustion together, this invention is characterized by supplying the primary ash (ash containing rough particles) from upper end of the furnace to form an upper layer of a two-tiered layer of ash, supplying the fly ash (ash containing minute particles) from an upper end of the furnace to form a lower layer of the two-tiered layer of ash, moving the two-tiered layer together towards the far end of the furnace, and heating and melting the two-tiered layer by a burner to form molten slugs during the moving step. When the burner is an oxygen-enriched burner, this configuration makes it possible to control the volume of oxygen to be added to the burner air (including changing the density of the oxygen). This invention can control not only the volume of fuel but also the density of the oxygen-enriched air and the volume of the ash to be supplied in response to the state of flow of the molten ash melted by the oxygen-enriched burner.

14 Claims, 13 Drawing Sheets

(1) SLUG TEMPERATURE CONTROL AT SLUG DRAIN PORT (2) SLUG VOLUME AT DRAIN PORT (3) SLUG VELOCITY AT DRAIN PORT

ASH MELTING FURNACE AND ASH MELTING METHOD THEREOF

FIELD OF THE INVENTION

This invention concerns an ash-melting furnace and a method used to melt the ash. The furnace uses a burner to heat and melt the surface of ash, which may be the fly ash or the ash exhausted from an incinerator such as that which burns municipal garbage or industrial waste, or from a coal-fired boiler. This melted ash is then discharged as liquified slugs.

DESCRIPTION OF THE RELATED ART

The material exhausted from an incinerator which burns municipal garbage or industrial waste contains ash and exhaust gases. The ash is treated with a water-sealing process; the resultant wet ash is collected, and dry ash is collected in the dry state. The two types of collected ash are preprocessed by crushing them and magnetically separating and removing their iron component which has a high melting point. The wet ash is then put through a drier and mixed with the dry ash to form primary ash.

The fly ash is captured when the gases exhausted from the incinerator pass through a dust chamber, such as a bag filter, before being released into the atmosphere.

The fly ash contains a considerable volume of heavy metals and salts with a low boiling point, and most of the components will volatilize and disperse among the gases when the ash is subjected to thermal processing at high temperatures. However, the salts will damage the heat resistant portions of the furnace. This is why it is uncommon to melt the fly ash by itself. Rather, most ash processors mix the fly ash with the primary ash and melt them together.

To melt and solidify the ash mixture described above, a burner-style ash-melting furnace is used. This is a furnace which applies heat to the surface of the ash to melt it and discharges the melted ash as slugs. There are two types of burner-style ash-melting furnaces: a furnace with a round, rotating surface, and a furnace with a fixed surface, which is an inclined reflecting furnace. Then following discussion of burner-style ash-melting furnaces, the primary application for this invention, will be based on the latter type of furnace, a fixed-surface ash-melting furnace, the operation of which will now be briefly explained.

FIG. 19 shows a fixed-surface melting furnace. In this drawing, ash-melting furnace 51 is comprised of floor 55, which inclines downward; ash supply unit 53, which is above one end of the main body of the furnace; discharge port 57, which is on the other end of the furnace; fixed burner 52, which is installed on ceiling 56; and pusher 58, which is a means to propel the ash forward in the furnace.

The supply unit 53 comprises ash stack 60 and its supply port 54. Ash stack 60 contains ash mixture 50, a combination of primary ash and fly ash. The ash is fed by gravity to the highest surface of the floor of the furnace, directly below supply port 54. The ash mixture which drops to this surface is intermittently forced along floor 55 towards the interior of the furnace by the action of pusher 58. This forms a layer of ash 59 all along the inclined surface of floor 55.

The burner 52 is placed along the central axis of ceiling 56. Liquid fuel which is forced into the burner is atomized by compressed air or steam from a waste heat boiler and sprayed into the chamber, where it is mixed with hot air supplied at the same time, causing it to combust. The flames from the fixed burner 52 heat and melt the surface of ash layer 59.

The end of floor 55 at the port 57 leads to the region where the flames from the burner 52 radiate. The exterior surface of ash layer 59, which continues to move towards the discharge port 57, is heated and liquified, forming molten ash 25, which collects in slug reservoir 65. This ash passes through drain port 20 in dike 23 as molten slugs 25a, which drip out of discharge port 57. These slugs are carried on a water-sealed conveyor (not shown) and discharged to the exterior.

Related art designs for such an ash-melting furnace have the following shortcomings.

The first problem has to do with the use of a burner relying on air.

If an air-fed burner is used in the related art apparatus described above, a preheater is needed to heat the air to be used for combustion in order to boost the temperature of the flame. Further, a dust separator is needed because a large volume of the exhaust gas will consist of substances with low boiling points. And NOx will be generated from the nitrogen in the considerable quantity of air used for combustion. For these reasons a recent trend is to substitute oxygen-enriched air (with an oxygen concentration of around 30%) for ambient air (with an oxygen concentration of around 21%).

However, the ash to be melted in this sort of furnace consists of various materials with different characteristics due to their different compositions. Insofar as incinerator ash is used, there is no way to avoid fluctuations of the load. The current demand is for appropriate countermeasures for these load fluctuations to assure stable and efficient operation and to produce high-quality molten slugs.

The second problem is associated with slug reservoir 65, in which the molten ash 25 accumulates, and drain port 20, which extends through dike 23 on the outlet side of the reservoir.

Dike 23, which creates the slug reservoir 65, and drain port 20 in dike 23 are shown in FIG. 21. Slug reservoir 65 is a more or less rectangular cistern. The molten ash 25 which accumulates in rectangular reservoir 65 is evacuated via drain port 20 in the center of the dike. However, the molten ash 25 which finds its way into the corners where dike 23 meets the walls of the reservoir stagnates there. The stagnant portions of the ash experience a drop in temperature and become larger, thus narrowing the channel. This has an adverse effect on the fluidity of the slug.

The third problem concerns the configuration of pusher 58, which moves along floor 55.

Either the ash layer 59 falls naturally from supply port 54 of the ash stack 60 and immediately forms a layer of ash with an angle of repose γ, or the ash 50 from stack 60 is pushed towards the discharge port 57 on the far end of the furnace by pusher 58, which moves along the floor 55 at the entrance to the chamber.

Burner 52, which heats and melts the ash, is located along the central axis of ceiling 56. As can be seen in FIG. 22 (A), this burner creates a more or less round region of radiated flame 35 on the central axis of the surface of ash layer 59. The ash in heated region 35a on the periphery of region 35 is heated and melts, forming a well of molten ash. From the well, the molten ash 25 drips out of discharge port 57. However, as can be seen in FIG. 22(A) and FIG. 22(B), the pusher 58 used in the related art has a pushing element made as a square form 58a of thickness t with a rectangular cross section. When the related art pusher 58 is used, the ash is pushed across the entire width of floor 55 equally and uniformly.

Thus the ash is supplied to the region outside heated area 35a in the same quantity as it is to area 35a. The ash supplied to the region outside heated area 35a is pushed from supply port 54 towards discharge port 57 in an unmelted state. This unmelted ash will be mixed in with the melted ash 25 which drips out of discharge port 57, degrading the quality of slugs 25a.

The fourth problem concerns the kinds of incinerator ash to be processed.

In addition to the aforesaid problem, related art ash-melting furnaces experience the following problems concerning the supply of ash even when only a single sort of ash is to be melted.

1) When the ash is supplied to the entrance of the chamber on the near end of floor 55 from stack 60 of ash supply unit 53, it is allowed to fall by its own weight. However, as the ash falls, it frequently develops cross-linkages, making it impossible to produce an even supply.

2) The ash which falls onto the near end of floor 55 is pushed along the inclined surface of the floor towards discharge port 57 on the opposite end of the chamber by pusher 58 to form ash layer 59. Pusher 58 moves back and forth intermittently. This intermittent movement, combined with the absorbed impact of ash falling on clumps of ash particles with even a weak coupling index, can cause sudden undulations in the surface of ash layer 59. Thus the state of the ash surface heated and melted by the radiant heat from the flame of burner 52 is unstable, making it virtually impossible to achieve a stable continuous outflow of molten ash 25.

In general, if different types of ash are to be melted, there will be another problem. The ash 50 is supplied via the supply unit 53. The surface of ash layer 59, which is formed by the action of pusher 58 as it travels along floor 55, will come to rest at a different angle of repose γ with respect to floor 55 depending on what type of ash it is. With some types of ash, the leading end of ash layer 59 will come to a stop a considerable distance from discharge port 57, or it will be pushed even beyond discharge port 57. If it stops too soon, the molten ash 25 will be formed short of discharge port 57, and its leading end will not go the required distance even when propelled by pusher 58. The molten ash 25 will not be able to flow out of the furnace, and it may happen that the heat-resistant material on floor 55 just before discharge port 57 becomes exposed and corrodes from the excessive heat.

If the ash layer travels too far, it will continue to melt, and when pusher 58 moves as the molten ash 25 flows from the far side of floor 55, the momentum of the new ash 50 which is supplied may cause the molten ash 25 to avalanche. Unmelted ash 50 will flow out with the molten ash 25, and the quality of the molten ash will suffer.

In other words, the angle of repose can be a help only when a stable supply of ash is achieved, as discussed above. How to achieve a stable supply of ash in the furnace is, therefore, a topic of the highest priority.

There is a further problem. A mixture of primary ash and fly ash is supplied to the interior of the furnace via the ash supply unit 53 in ash-melting furnace 51. A layer of composite ash is formed, heated and melted.

However, an ash layer 59 which consists of this sort of composite mixture has the following problem. When the radiant heat from the flame of burner 52 is applied to its surface to heat it, the combustion gases from the burner cause superfine particles such as the fly ash to be blown up and around. Many of these particles escape from the ash-melting furnace with the exhaust gases.

SUMMARY OF THE INVENTION

The object of this invention is to provide an ash-melting furnace which can respond to fluctuations in the load and which will be capable of highly efficient and stable operation. More specifically, its object is to provide an ash-melting furnace which is able to control the quantity of ash supplied and the quantity of heat produced by the burner in response to the state of the outflow of the molten slugs.

Another object of this invention is to provide an ash-melting furnace with an efficient drain which can maximize the fluidity of the molten slugs being released. More specifically, this object is to provide an ash-melting furnace which will assure that the molten slugs consisting of molten ash which has accumulated in the slug reservoir will have sufficient fluidity to allow them to reach the discharge port and will flow at a higher velocity.

Yet another object of this invention is to provide an ash-melting furnace in which the pusher to force the layer of supplied ash along the floor of the furnace towards the discharge port will have a pushing element of a novel shape, so that as little as possible of the ash pushed forward by the pusher will land outside the region of the furnace where heat is applied, i.e., out of the region where the heat from the burner flame radiates.

Yet another object of this invention is to provide an ash-melting furnace having a configuration which enables a continuous stable supply of ash from the supply port towards the discharge port in the floor of the furnace in order to assure a stable outflow of molten ash with minimum fluctuation.

Yet another object of this invention is to provide an ash-melting furnace and a method of melting the ash which will enable ash to be melted efficiently when a composite ash consisting of a mixture of the primary ash, namely, incinerator ash, and fly ash is melted. It will do so by preventing the fly ash from flying about in the furnace when the composite ash is melted.

The invention in claims 1 and 2 concerns control of the heating using an oxygen-enriched burner. It enables the control of the volume of oxygen to be added to the burner air (including the ability to change the density of the oxygen). This invention can control not only the volume of fuel but also the density of the oxygen-enriched air and the volume of the ash to be supplied in response to the state of flow of the molten ash melted by the oxygen-enriched burner.

In an ash-melting furnace according to the invention in claim 1, which comprises an ash supply port to supply ash provided at one end of the furnace; a slug discharge port to discharge the molten slugs of the ash at the other end of the furnace; an oxygen-enriched burner to melt the ash supplied from the ash supply port, the supplied ash being pushed forward along an inclined floor towards a drain port provided at the far end of the inclined floor to drain the molten slug, this ash-melting furnace is characterized by the following features. It further comprises a monitoring means to monitor the drain state at the slug drain port, such as a temperature, a volume, and a drain velocity of the continuous outflow of the molten slug; and a control means to control either the quantity of the ash supplied or the quantity of heat produced by the oxygen-enriched burner in response to a signal from the monitoring means in order to achieve a stable continuous outflow of the molten slug.

To be more specific, as claimed in claim 2, the ash-melting furnace has a combustion control device which comprises a monitoring means to monitor the drain state at the slug drain port, such as temperature, volume, and drain velocity of the continuous outflow of the molten slug; a calculation means to calculate a control signal either for the quantity of the ash supplied or the quantity of heat produced by the oxygen-enriched burner; and a control means to control either the quantity of ash supplied, or the quantity of heat produced by the oxygen-enriched burner in response to the control signal from the calculation means.

This invention enables a reduction of the volume of NOx generated in the furnace by properly adjusting the volume of oxygen supplied to the oxygen-enriched furnace, thus reducing the volume of thermal NOx to be released.

When the volume of exhaust gas is reduced, preheaters, dust eliminators and equipment to treat exhaust gas in order to eliminate NOx can be made smaller, saving space in the plant or reducing its size as well. By responding to the state of discharging the molten slug from the slug drain port, the furnace can be operated in a more stable and efficient fashion.

In this embodiment, if the detected temperature of the slug is appropriate, its volume of flow as calculated from the width and the velocity of the slug flow can be adjusted by controlling the quantity of ash to be supplied, and the temperature and the velocity of the slug flow can be adjusted by controlling the quantity of heat produced by the burner.

The heat produced by the oxygen-enriched burner is controlled by adjusting the quantity of fuel supplied to the burner, the volume of air used to induce combustion, or the volume of oxygen added to this air. Thus a smaller volume of gas is required, and the temperature of the combustion gases will increase rapidly. Less exhaust gas will be released and the temperature of the flame can be increased quickly. This allows combustion to be induced more efficiently.

The quantity of fuel, the volume of air, and the volume of oxygen are preferably controlled independently.

In this invention, an infrared CCD camera monitors the drain state at the slug drain port; the temperature, the volume, and the drain velocity of the continuous outflow of the molten slug are detected in responding to these detected data; the quantity of the ash supplied and/or the quantity of heat produced by the oxygen-enriched burner are adjusted. Therefore, if the detected temperature of the slug is appropriate, its volume of flow as calculated from the width and the velocity of the slug flow can be adjusted by controlling the quantity of ash supplied, and the temperature and the velocity of the slug flow can be adjusted by controlling the quantity of heat produced by the burner.

The heat produced by the oxygen-enriched burner can be controlled by adjusting the quantity of fuel supplied to the burner, the volume of air used to induce combustion, or the volume of oxygen added to this air. Thus a smaller volume of gas is required, and the temperature of the combustion gases will increase rapidly if compared with the configuration with a conventional air burner which adjusts them by increasing the volume of fuel and combustion air. With the configuration according to this invention, less exhaust gas will be released, and the temperature of the flame can be increased quickly. Thus, this invention can provide an ash-melting furnace which can respond to fluctuations in the load and which is capable of highly efficient and stable operation.

The object of this invention according to claims 3 through 5 is to provide an ash-melting furnace with an efficient drain which maximizes the fluidity of the molten slugs being released. In an ash-melting furnace according to the invention in these claims, which comprises an ash supply port to supply ash provided at one end of the furnace; a slug discharge port to discharge the molten slugs of the ash at the other end of the furnace; an oxygen-enriched burner to melt the ash supplied from the ash supply port, the supplied ash being pushed forward along an inclined floor towards a drain port provided at the far end of the inclined floor to drain the molten slug, this ash-melting furnace is characterized by the following features. It further comprises a guide wall on a dike for providing a fluidity of the molten slugs at the drain port.

To be specific, the guide wall of the dike preferably is continually straight or curved, and its width is gradually narrowed in a plane surface towards said drain port. It is also preferable that the drain port is provided in the center of the dike, and a floor of a slug reservoir is recessed along the orthogonal direction of the slug flow, which slopes gradually downward from upstream to downstream.

In the invention claimed in claims 3 through 5, since the guide wall is provided on the dike at the end of the slug reservoir to pool the molten slug, the ash melted by the heat from the burner is made to move towards the drain which is the outlet of the slug reservoir without being collected in a specially constructed reservoir unit and without leaving unburned sediment behind. The molten ash is efficiently directed towards the slug drain port, so that it can be discharged smoothly.

Because the slug reservoir is shaped like a funnel from its entry to its drain, the two corners on the sides of the dike are eliminated, and the flow of molten slug is now concentrated naturally towards the drain. The flow velocity in the streamlined reservoir towards the dike is slower than in related art reservoirs. As a result, the heat-resistant materials near the dike experience less high-temperature corrosion.

Since the slug drain port is arranged directly in the center of the dike, the ash molten by heat from a burner installed along the center line of the furnace body is assured that the central portion of the molten ash will flow smoothly along the center line of the floor.

The end of the floor inclines somewhat gradually downward along its center line to form a concavity. This assures that the flow of molten ash towards the drain can be directed and concentrated in the direction of the drain even from locations distant from the drain.

The notch of the drain port may also be shaped like the bottom of a ship, so that the molten slug will move smoothly while passing through the drain.

In an ash-melting furnace according to the invention in claims 6 through 8, which comprises an ash supply port to supply ash provided at one end of the furnace; a slug discharge port to discharge the molten slugs of the ash at the other end of the furnace; and a pusher to push the ash on the inclined floor supplied from the ash supply port towards the region covered by the radiant heat of a burner for melting the ash, this ash-melting furnace is characterized by the following features. The pusher mentioned above has a pushing surface provided at the end thereof, and the shape of either side of the pushing surface is different from the shape of the central portion of the pushing surface in order to supply the ash efficiently to the central region covered by the radiant heat of the burner.

The central portion of the pushing surface can be higher than either side, or the center portion can be formed flat and either side can have a backwardly inclined surface in order to supply the ash efficiently to the central region covered by the radiant heat of the burner.

As an alternative, the central portion of the pushing surface can drop away towards the center to form a concave pushing surface so that the pushing surface is directed towards the center line which passes through the middle of the region of radiant heat.

Since a pusher whose front end is configured as in this embodiment is quite different from pushers of the related art, which had a rectangular cross section and which pushed a uniform quantity of ash all across their width, this new design allows a larger quantity of ash to be pushed towards the center of the furnace. This maximizes the quantity of ash supplied to the center and minimizes the quantity supplied to either side.

If the end of the pusher has its sides furthest forward with the surface dropping away towards the center to form a concave pushing surface, the ash pushed by the said surface will be directed towards the center line which passes through the middle of the region of radiant heat. This design has the effect of maximizing the quantity of ash delivered to the center of the furnace and minimizing the quantity delivered to either side.

Since the central portion of the pushing surface is higher than either side, or the center portion can be formed flat and the both sides are raked back at a steep angle, the advancing pusher will leave behind the ash on either side which is outside of the heated region comprising the area covered by the radiant heat from the burner in the center of the furnace. When the pusher advances, the ash in front of its central portion will be pushed forward, but the ash on either side of its backwardly inclined surfaces will be left behind. This design makes it possible to supply ash only to the center of the furnace.

Since the end of the pusher has its sides furthest forward with the surface dropping away towards the center to form a concave pushing surface, the ash pushed by the surface will be directed towards the center line which passes through the middle of the region of radiant heat. This design has the effect of maximizing the quantity of ash delivered to the center of the furnace and minimizing the quantity delivered to either side.

The embodiments defined in claims 9 through 11 show ash-melting furnaces from which the drainage of molten ash is stable with little fluctuation. In an ash-melting furnace comprising an ash supply port to supply ash provided at one end of the furnace; a slug discharge port to discharge the molten slugs of the ash at the other end of the furnace; a burner to melt the ash supplied from the ash supply port, the supplied ash being pushed forward along an inclined floor towards a drain port provided at the far end of the inclined floor to drain the molten slug, this ash-melting furnace is characterized by the following features. It further comprises an ash feeding means, such as a screw feeder, provided in the ash supply port to continuously feed the ash from the ash supply port along the inclined floor.

The first ash feeding means is preferably oriented lengthwise along the inclined floor from the ash supply port, and the second ash feeding means is oriented vertically above the ash supply port. It can further comprise a gate along the wall of the ash supply port in order to adjust the height of the layer of ash on the inclined floor.

With this invention, since the ash delivered via the supply port onto the floor of the furnace is continuously pushed forward along the floor by the feeding device, the layer of ash created on the inclined surface of the floor will travel forward in a stable fashion without experiencing undulation. It will be in a uniform state, and its surface will receive a constant quantity of radiant heat from the burner. This will produce a stable drainage of molten ash. Because the feeding device is a screw feeder, the ash can be supplied continuously or in varying amounts. This allows the system to respond effectively to load fluctuations due to the type and condition of the ash used.

Since the screw feeders are provided to supply the ash both from the supply port to the near end of the furnace floor and from there down the floor to the far end, these feeders allow the quantity of ash supplied to be varied across the width of the furnace.

If a plurality of screw feeders are installed across the width of the floor and the quantity of ash to be supplied is controlled, they allow heating disparities across the width of the furnace which are due to the position of the burner to be addressed by increasing or decreasing the quantity of ash being fed. This allows the state of melting to be equalized across the furnace.

The feeding means to continuously feed the ash along the floor will create a stable ash layer. If a gate is also provided at the supply port to change the height of the partition which forms the supply unit, it can be used to control the angle of repose of the ash layer. This will assure a stable drainage even when ash of different types is being melted.

The invention claimed in claims 12 through 17 concerns an ash melting furnace which mixes and melts the primary ash and the fly ash of the combustion ashes together. In the ash melting method to melt the ash, which comprises the step of supplying ash on the inclined floor from one end of the furnace, melting the supplied ash by a burner, and pushing it forward along the inclined floor towards a drain port provided at a far end of the inclined floor to drain the molten ash, discharging molten slugs of the ash at the other end of the furnace, this invention is characterized by the following features. In the step of supplying ash, it further comprises the step of supplying the primary ash (ash containing rough particles) from the upper end of the furnace to form an upper layer of a two-tiered layer of ash, supplying the fly ash (ash containing minute particles) from the upper end of the furnace to form a lower layer of the two-tiered layer of ash, moving the two-tiered layer together towards the far end of the furnace, and heating and melting the two-tiered layer by a burner to form the molten slugs during the moving step.

In order to melt the ashes as mentioned above, this invention discloses the ash-melting furnace to perform efficiently as follows. In the ash-melting furnace which comprises an ash supply port to supply ash provided at one end of the furnace; a slug discharge port to discharge the molten slugs of the ash at the other end of the furnace; a burner to melt the ash supplied from the ash supply port, the supplied ash being pushed forward along an inclined floor towards a drain port provided at a far end of the inclined floor to drain the molten slug, this ash-melting furnace is characterized by the following features. It comprises at least two sets of ash supply ports to supply ash provided at an upper end of the furnace, the first ash supply port being used for supplying the primary ash, the second ash supply port being used for supplying the fly ash (ash containing minute particles), the primary and fly ash forming a two-tiered layer of ash on an inclined floor, the first and second ash supply ports being arranged in such a way that the fly ash forms a lower layer of the two-tiered layer, and the primary ash forms an upper layer on the lower layer of fly ash.

The first ash supply port used for supplying the primary ash can be located at a downstream area of the furnace, and the second ash supply port used for supplying the fly ash can be located at an upstream area of the furnace, respectively. The first ash supply port used for supplying the primary ash alternatively can be located at an upper area above the floor of the furnace, and the second ash supply port used for supplying the fly ash can be located at a lower area above the floor of the furnace.

This invention further comprises an ash feeding means, such as a screw feeder, to feed the fly ash at an upstream area of said furnace, the ash feeding means being oriented lengthwise along the inclined floor from the ash supply port.

This invention further comprises a gate along the wall of the ash supply port in order to adjust the height of the layer of ash on the inclined floor.

With this embodiment, then, a lower layer of fly ash is formed with a layer of primary ash on top of it. This results in a two-tiered layer of ash in the furnace, with the fly ash completely covered by primary ash. The proportions of the two types of ash in this layer can easily be adjusted, so the minute particles of fly ash are not directly exposed to the exhaust gases from the burner. This eliminates the problem of the greater part of the fly ash escaping to the exterior with the exhaust gases. Further, the fly ash is melted smoothly by the heat conductively transferred from the primary ash and by the heat directly transferred from the molten ash.

Since the inlet for the primary ash is placed further forward on the furnace and the inlet for the fly ash is placed just behind it, the primary ash is deposited as a top layer, and the fly ash is deposited below the primary ash. A reliable two-tiered layer is, therefore, formed in which the primary and fly ash are clearly segregated.

The inlet for the primary ash is arranged vertically above the near end of the floor of the furnace. Therefore the fly ash is disposed longitudinally along the inclined surface of the floor. Thus a layer of fly ash can be formed which has no irregularities or bends to obstruct the flow of particles. Such a layer can flow steadily without experiencing undulations. Because the primary ash, which consists of coarser particles, is deposited atop the fly ash, an upper layer flow is generated in the upper portion of the relatively smooth layer of fly ash on the floor of the furnace. This creates a well-defined two-tiered layer in which the primary and fly ash are clearly separated.

With this configuration mentioned above, there may be some irregularities or bends in the ash-supplying path for the primary ash at the contact area with the fly ash layer. However, because the primary ash consists of coarser particles, there will be no trouble for the ash layer to flow smoothly.

Because several screw feeders are provided in at least one location, namely the inlet for the fly ash, as the feeding means to force feed the fly ash from outside of the furnace, the fly ash can flow in stable fashion. As a result, this ensures that the two-tiered layer will form in a stable fashion. The amount of fly ash in the two-tiered flow can be adjusted to provide an appropriate proportion of primary to fly ash. This allows the supply of an amount of fly ash such that the primary ash enclosing the fly ash will reliably melt.

Because a gate is provided to adjust the height of the partition which determines the quantity of ash to be supplied to the inlet for the primary ash, it is easy to adjust the proportions of primary and fly ash in the mixture. By adjusting the angle of repose for each type of primary ash, the operator can assure that the leading end of the layer of primary ash ends up an appropriate distance from the discharge port. This will result in a stable flow of molten ash consisting of primary and fly ash.

BRIEF DESCRIPTION OF THE DRAWINGS

FIGS. 4 show plan views of the slug reservoir at the downstream end of the furnace according to preferred embodiments of this invention.

FIGS. 10 show another embodiment of the pusher shown in FIG. 8.

DETAILED DESCRIPTION OF THE PREFERRED EMBODIMENTS

In this section, a detailed explanation of the invention will be given with reference to the drawings. To the extent that the dimensions, materials, shape and relative position of the components described in these embodiments need not be definitely fixed, the scope of the invention is not limited to the embodiments as described herein, which are meant to serve merely as examples.

Figure 1:
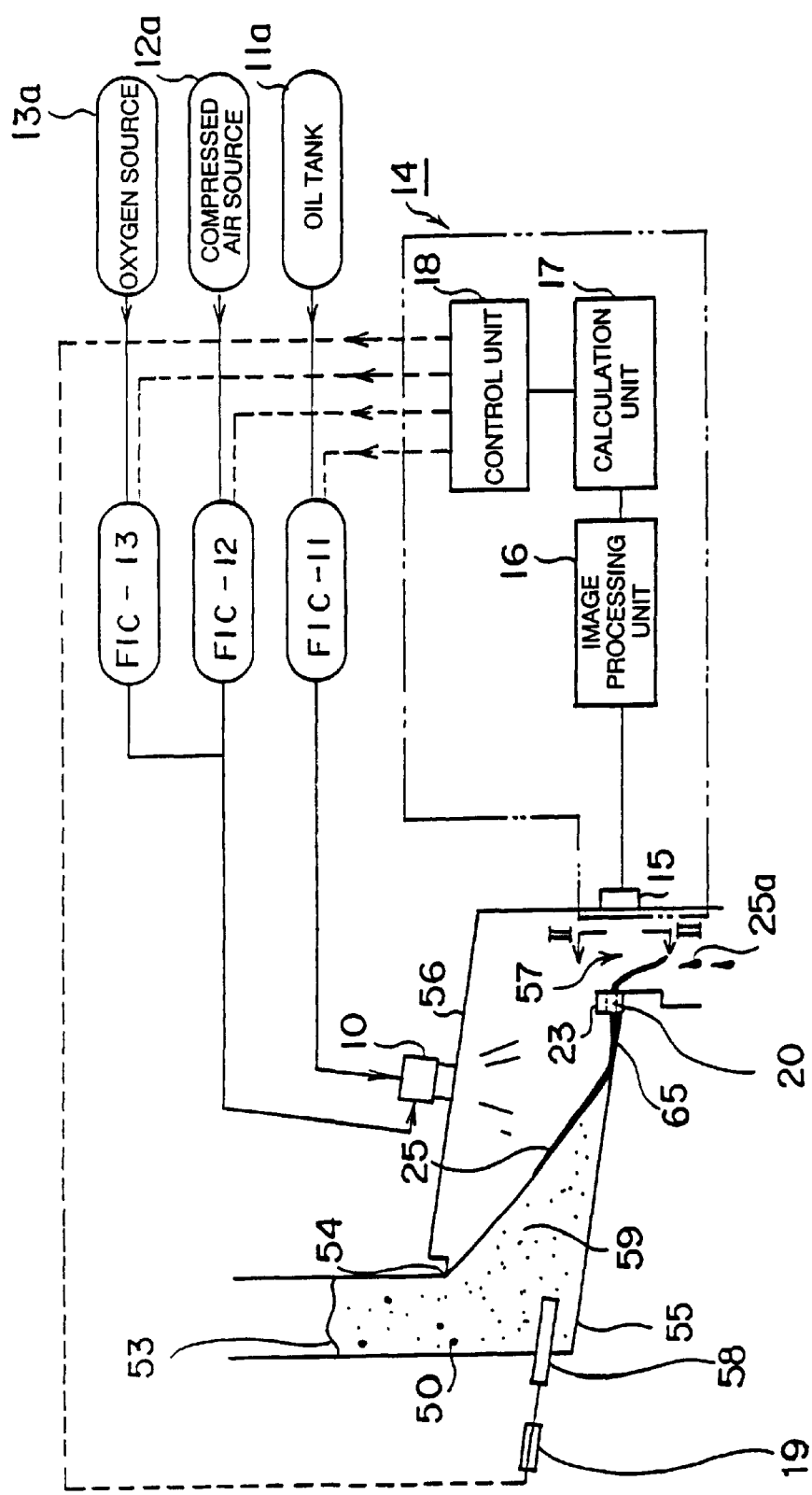
FIG. 1 is a rough block diagram of a system to control combustion in an ash-melting furnace which is a first preferred embodiment of this invention.
Figure 2:
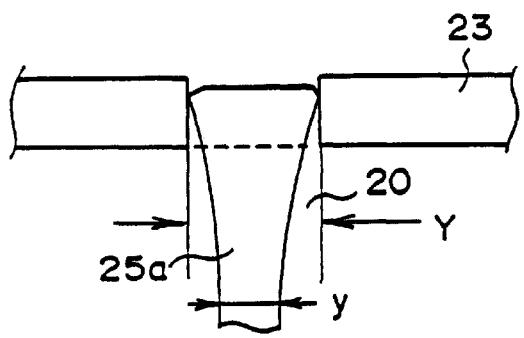
FIG. 2 is an enlarged view to show discharging the molten slug from the drain port taken along line II—II shown in FIG. 1.

FIG. 1 is a block diagram of a system to control combustion in an ash-melting furnace which is a first preferred embodiment of this invention.

The ash-melting furnace of this invention has, at one end of the furnace body, an ash supply unit 53 with an ash supply port 54 below it. Ash 50 is supplied via the supply port 54 and deposited on floor 55 directly below the port. Pushed forward by pusher 58, the supply device, the ash forms a layer 59 along inclined floor 55 as it travels towards the far end of the floor. The ash on the surface of the layer 59 is heated and melted by oxygen-enriched burner 10, which is installed on the center line of ceiling 56 on the top of the furnace body. The resulting molten ash 25 flows through slug drain port 20 at the far end of floor 55 towards discharge port 57 in the form of molten slugs 25a. In these respects the current invention does not differ from the related art apparatus discussed above.

In this embodiment, infrared CCD camera 15 or some other industrial CCD camera which can measure temperature distribution is installed on the far end of the furnace body so that it can monitor the state of flow of the molten slugs 25a which drip from drain port 20. Combustion control device 14 controls the quantity of ash supplied and the quantity of heat produced by the burner in response to the state of flow of the molten ash.

The oxygen-enriched burner 10 is supplied with fuel from oil tank 11a, the fuel source, via valve FIC-11, which controls the volume of flow. Oxygen is added to the compressed air supplied from source 12a (an air blower) via valve FIC-12, which controls the volume of flow. The oxygen is drawn from oxygen source 13a (an oxygen generator PSA or an oxygen cylinder) and supplied via valve FIC-13, which controls the volume of flow. In this way the e required concentration of oxygen (25 to 40%) can be achieved in the oxygenated air supplied to the burner.

Valves FIC-11, FIC-12 and FIC-13 are each actuated remotely on receipt of a signal from the combustion control device 14.

Ash supply control unit 19 controls the range of motion (i.e., the linear travel) of pusher 58 so as to control the quantity of ash supplied.

A screw feeder, which will be shown in a subsequent embodiment, may be used as the pusher 58. In this case ash supply control unit 19 would control the rotary speed of the feeder.

The combustion control device 14 comprises infrared CCD camera 15; image processing unit 16, which processes the images obtain ed by camera 15, including producing, eliminating, synthesizing and comparing images; calculation unit 17, which, using the data obtained from the processing unit 16, performs required control operations which will be discussed shortly; and control unit 18, which, based on the result of the control operations, outputs signals to optimally control the operation of the valves FIC-11, FIC-12 and FIC-13, as well as the operation of unit 19, which governs the quantity of ash supplied. Commands from control unit 18 respectively actuate the valves FIC-11, FIC-12 and FIC-13 and the ash supply control unit 19.

The infrared camera or other industrial CCD camera 15 can detect temperature distribution. The standard value is calculated by the comparison between width y, the width of the slug at a predetermined distance from the drain, and the width Y of the drain, and the relevant data for the control is obtained using the standard value each time. The temperature of the slug is detected based on a color signal.

The order of control operations in this embodiment will next be explained with reference to FIGS. 3.

Figure 3:
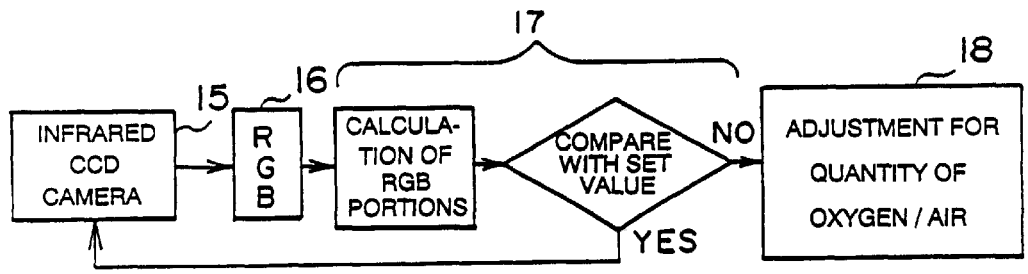
FIGS. 3 are diagrams of the control operations shown in FIG. 1.
Figure 3:
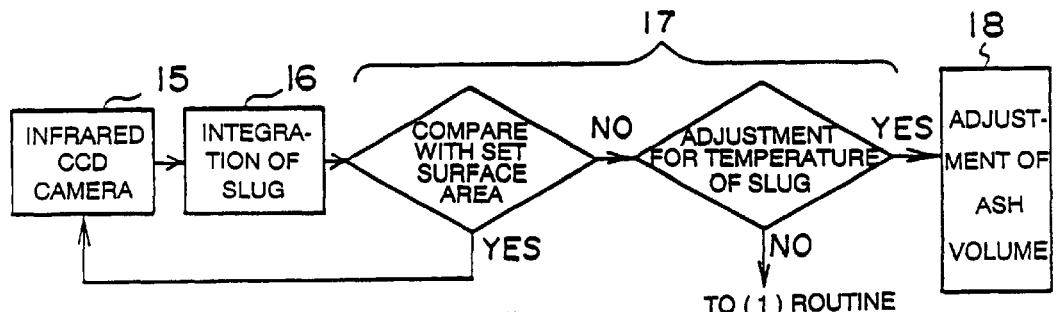
Figure 3:
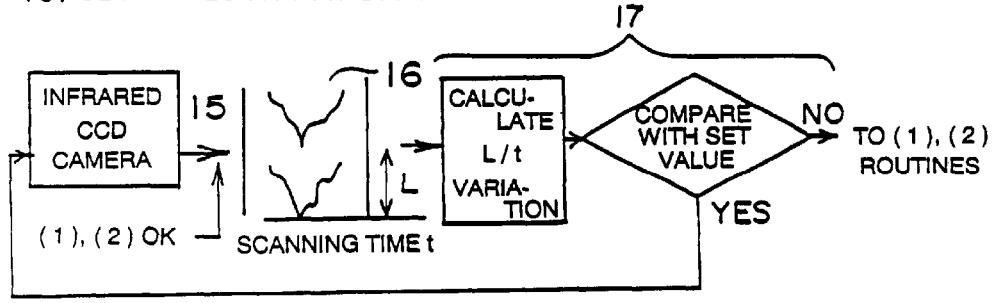

As can be seen in FIG. 3(1), the temperature of molten slug 25a is obtained from infrared CCD camera 15. This value is compared with a set value (i.e., a standard value). When it is detected that the temperature is above a given value, the quantity of oxygen or fuel is adjusted so that the temperature of the slug regains its set value.

As is shown in FIG. 3(2), the surface area of molten slug 25a is obtained by integration processing. Its volume of flow is detected by observing the changes in its surface area over time. Each value is compared with a set value for surface area. If there is no variation in the temperature of the slug, the quantity of ash supplied is adjusted. If the temperature of the slug should vary, the control measures described in FIG. 3(1) above are implemented to adjust the temperature within the furnace and that of the slug. In this way the slug's volume of flow is brought back to the prescribed value.

As can be seen in FIG. 3(3), the displacement L of the slug is detected over scan time t and used to obtain the velocity of the slug's flow. This value is compared with a set value. When it is detected that the velocity of the flow has exceeded a given value, the measures described in FIG. 3(1) and FIG. 3(2) above are implemented to adjust the volume of oxygen added to the air and/or the quantity of fuel or ash supplied. In this way the slug's velocity of flow is brought back to the prescribed value.

The foregoing control measures also counteract fluctuations in the load imposed by molten slugs 25a (i.e., changes in ash quality) and thereby allow the slugs to drain in a more stable fashion.

The addition of oxygen to the air as described above allows the oxygenated air used in burner 10 to have the appropriate concentration of oxygen. This allows a higher combustion temperature to be used than was the case with related art burners and assures stable discharge of the molten slugs 25a.

In contrast to the way heating was controlled in related art air burners, in this invention it is controlled by the addition of oxygen. This allows the burner to function with a smaller volume of air and requires less nitrogen in the furnace. The results are less thermal NOx and less exhaust gas, which translate into a reduction of equipment and operating costs to process exhaust gas.

In this embodiment, if the temperature of the slug is appropriate, its volume of flow can be controlled by adjusting the quantity of ash supplied, and its temperature and flow velocity can be controlled by adjusting the quantity of heat produced by the burner to an appropriate value.

The quantity of heat produced by the burner can be adjusted by correcting the volume of fuel supplied to the burner, the volume of air supplied for combustion or the volume of oxygen added to that air. When this is compared with the method used to adjust the heat in the related art, namely to increase the quantity of fuel or the volume of air used for combustion, we see that increasing the volume of oxygen added to the air (and so decreasing the volume of nitrogen) has the effect of reducing the volume of gas and raising the temperature of the exhaust gases. Thus a smaller volume of exhaust gases will be released, and the flame of the burner will have a higher temperature. Load fluctuations can be addressed promptly, resulting in more stable and efficient operation.

Since properly adjusting the volume of oxygen to be added to the air has the result of reducing the volume of nitrogen which goes into the furnace, it follows that a smaller volume of thermal NOx will be released.

When the volume of exhaust gas is reduced, preheaters, dust eliminators and equipment used to treat exhaust gas in order to eliminate NOx can be made smaller, saving space in the plant or reducing its size as well.

In this embodiment, if the detected temperature of the slug is appropriate, its volume of flow as calculated from the surface area of the flow per unit of time can be adjusted by controlling the quantity of heat produced by the burner.

The heat produced by the oxygen-enriched burner is controlled by adjusting the quantity of fuel supplied to the burner, the volume of compressed air used to induce combustion, or the volume of oxygen added to this air. Thus a smaller volume of gas is required, and the temperature of the combustion gases will increase rapidly. Less exhaust gas will be released and the temperature of the flame can be increased quickly. This allows combustion to be induced more efficiently.

FIG. 1 shows the basic configuration of an ash-melting furnace according to this invention. In this ash-melting furnace, ash supply unit 53 is on one end of the main body of the furnace, and supply port 54 is directly below it. The ash 50 is supplied via supply port 54 and deposited on floor 55 under the supply port. A layer of ash 59 is created along inclined floor 55 and made to move towards the far end of the floor. Oxygen-enriched burner 10, which is installed on the center line of ceiling 56 on top of the furnace body, heats and melts the ash on the surface of ash layer 59. The resulting molten ash 25 accumulates as molten slug in reservoir 65, which is created by dike 23, a structure at the far end of the floor 55. The accumulated molten slug 25a passes through drain port 20, which is in the center of the dike 23, and exits through discharge port 57.

Figure 4A:
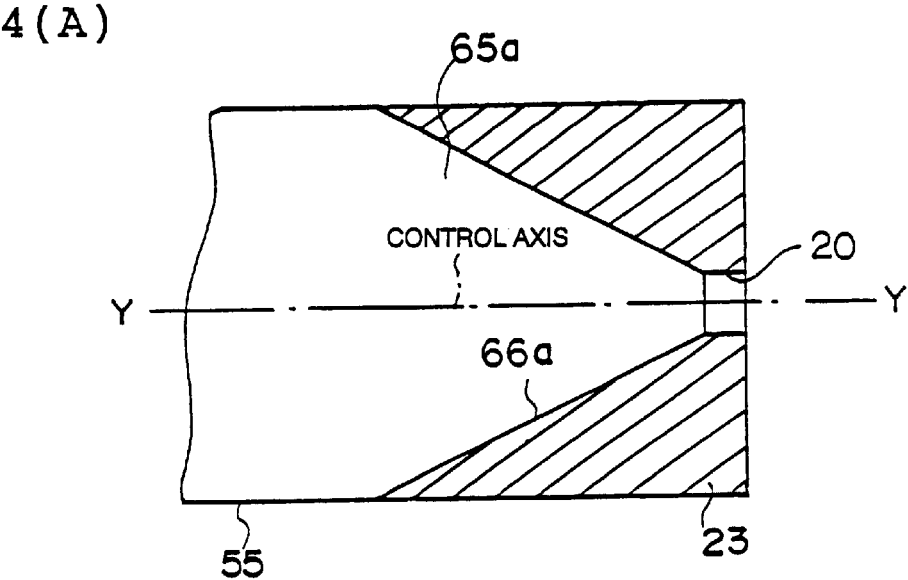
FIG. 4(A) shows a slug reservoir of triangular form.
Figure 4B:
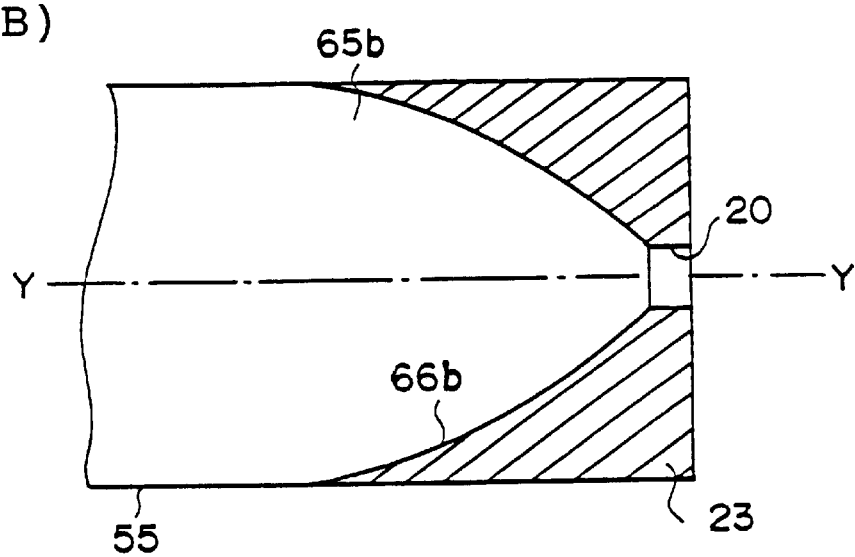
FIG. 4(B) shows a slug reservoir of parabolic form.
Figure 4C:
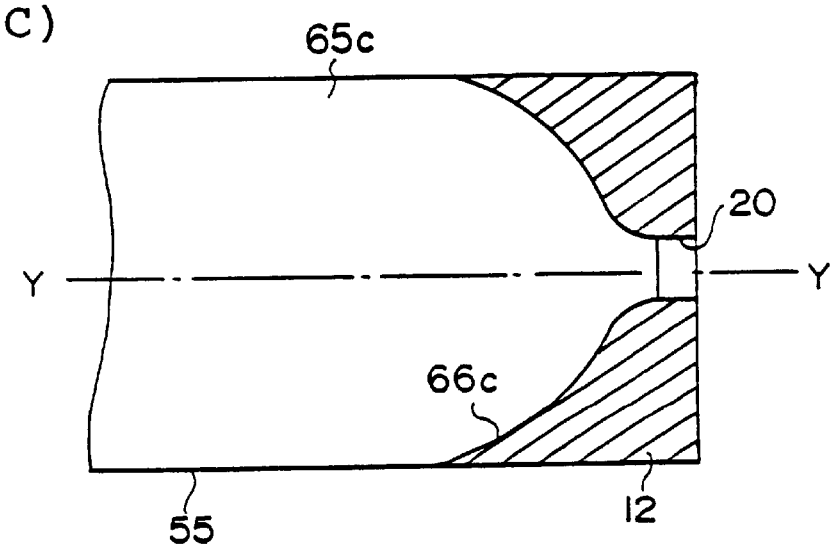
FIG. 4(C) shows a slug reservoir of funnel-shaped form.
Figure 5:
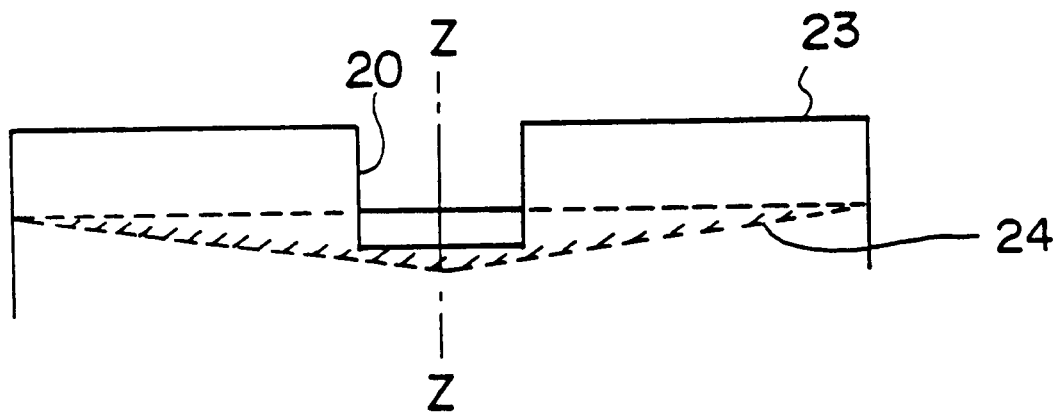
FIG. 5 shows an enlarged view taken along line II—II in FIG. 1 which corresponds to FIGS. 4.
Figure 6:
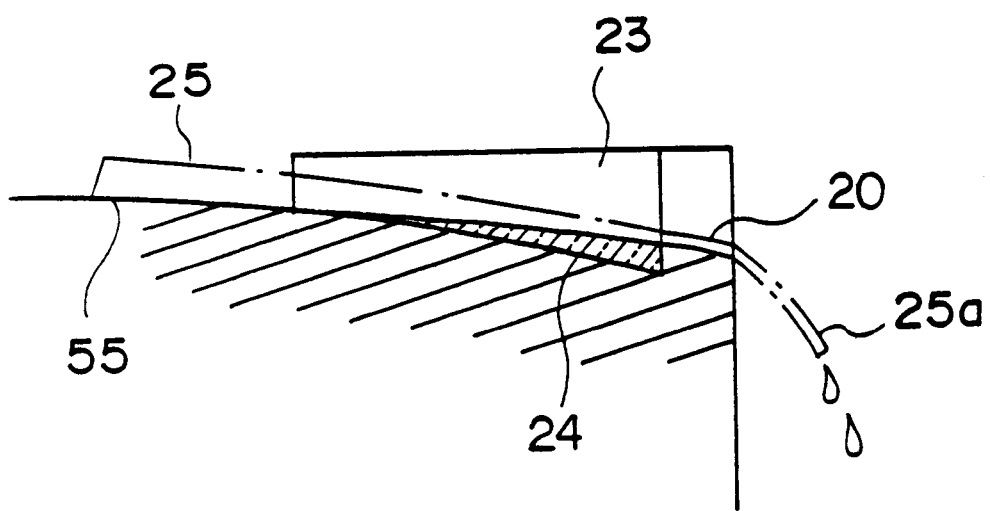
FIG. 6 shows a cross section taken along line Z—Z in FIG. 5, which is a vertical cross section of the slug reservoir.

FIGS. 4 through FIG. 6 show the shapes of the floors in several ash-melting furnaces which are other preferred embodiments of this invention. They are designed to assure that the molten slug on the floor of the furnace will have high fluidity during its passage towards the discharge port and to improve the speed at which it will be discharged.

The slug reservoir 65 is shown in FIG. 4(A), 4(B) and 4(C). In each case it is almost funnel-shaped and leads to drain port 20, which is placed along the center line Y—Y of dike 23 at the far end of floor 55. This reservoir may be triangular, like reservoir 65a, parabolic, like reservoir 65b, or funnel-shaped, like reservoir 65c. In these examples, the lateral guide walls of dike 23 may be straight, like surfaces 66a, curved, like surfaces 66b, or funnel-shaped, like surfaces 66c. The width of the inflow of molten slug towards drain port 20 is gradually narrowed by the continuous surfaces 66a, 66b and 66c. In this way the flow of the slug is naturally made to converge towards drain port 20.

The configuration of the slug reservoir 65 is shown in greater detail in FIG. 5 and FIG. 6. FIG. 5 shows the shape of the floor of reservoir 45 in a cross section which is orthogonal to the direction of flow. The floor is recessed like the bottom of a ship in such a way that the deepest part runs along the center line Z—Z of reservoir 65. Along center line Z—Z in its longitudinal direction (the direction of flow), floor 24 (shown by angled lines) slopes gradually downward from upstream to downstream. The effect of this inclined, ship bottom-shaped floor 24 is to cause the flow of molten slug 25a to converge towards the center line Z—Z of drain port 20.

The notch of the drain port 20 may also be shaped like the bottom of a ship (i.e., it may be a flattened "V"), so that the molten slug will move smoothly while passing through the drain.

In this embodiment, the ash melted by the heat from the burner is made to move towards the drain, which is the outlet of the slug reservoir, without being collected in a specially constructed reservoir unit and without leaving unburned sediment behind. The molten ash is efficiently directed towards the slug drain port so that it can be discharged smoothly. The slug flows more rapidly and has less contact with the floor of the furnace and less surface area. As a result, it experiences less thermal loss.

The slug reservoir is shaped like a funnel from its entry to its drain. Because the two corners on the sides of the dike have been eliminated, the unburned sediment which collected there has also been eliminated. The flow of molten slug is now concentrated naturally towards the drain. The flow velocity in the streamlined reservoir towards the dike is slower than in related art reservoirs. As a result, the heat-resistant materials near the dike experience less high-temperature corrosion.

The drain is placed directly in the center of the dike, and the ash is melted by heat from a burner installed along the center line of the furnace body. This design assures that the central portion of the molten ash will flow smoothly along the center line of the floor.

The end of the floor inclines somewhat downward along its center line to form a concavity. This assures that the flow of molten ash towards the drain can be directed and concentrated in the direction of the drain even from locations distant from the drain.

Next, several improvements in the shape of the end of the pusher in the device to push the ash are shown in FIG. 7 through FIGS. 10.

Figure 7:
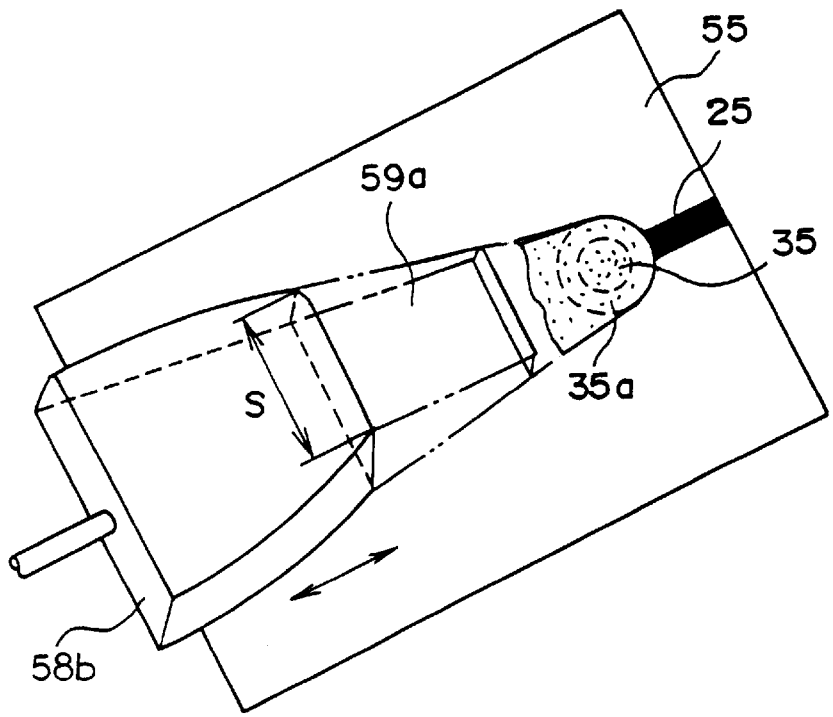
FIG. 7 is a diagram showing one form of a contacting surface of a pusher, and a movement of the ash layer according to a preferred embodiment of this invention.
Figure 8:
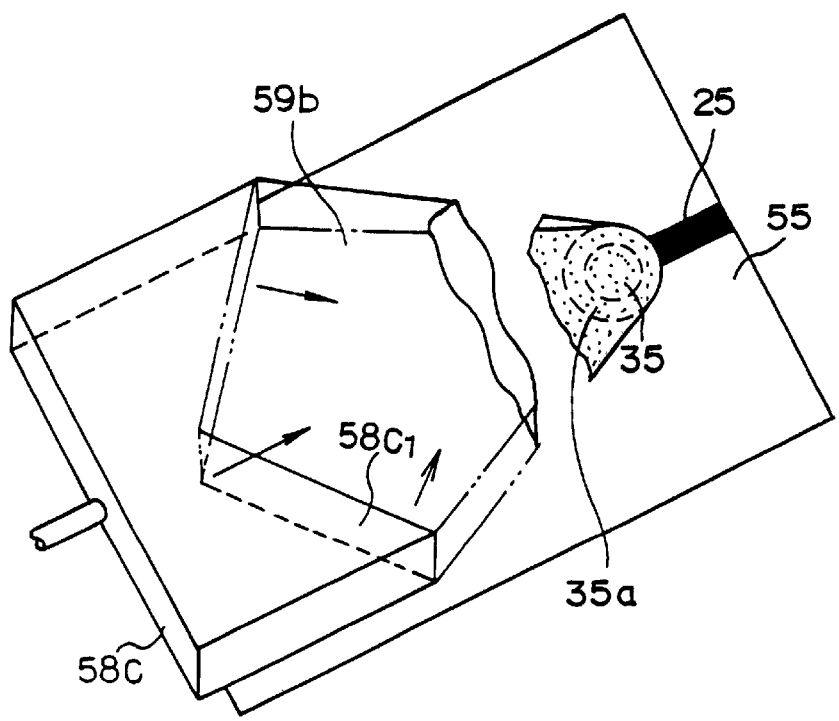
FIG. 8 is another diagram showing a form of a contacting surface of a pusher, and the movement of the ash layer according to another preferred embodiment of this invention.

FIG. 7 and FIG. 8 show the shapes of the contacting portions of two pushers and illustrate how the ash is supplied by the said pushers to the portion of the furnace which contains the region covered by the radiant heat of the burner.

As can be seen in FIG. 7, pushing element 58b at the end of the pusher in the first embodiment is narrower at its base than the overall width of floor 55. The central portion of its end is flat, and its sides gradually widen from front to back. To be more specific, its front surface is orthogonal to the direction of flow. Its overall shape from front to back is that of a pedestal with a flat top. Its sides are slightly curved and incline at a steep reverse angle. Thus the clumps of ash pushed forward by pushing element 58b as it moves back and forth in an appropriate range of motion, as shown by the arrows, form an ash layer 59a whose leading end narrows as it advances. This ash layer moves towards heated region 35a, which is in the vicinity of the region covered by the heat radiating from the flame of burner 10. If the width S of the end of the pushing element and the position where the end of pushing element 58b comes to rest are selected appropriately, the ash to be melted can be supplied efficiently to the region 35 of radiant heat, and the quantity of ash supplied to the unheated portion of the furnace can be minimized.

FIG. 8 shows the shape of the pushing element in a second embodiment of the pusher and the movement of the ash layer formed by the pushing element.

As can be seen in FIG. 8, the pushing element 58c of this pusher is formed of a material whose width is close to that of floor 55. Its center is indented to form a concave pushing surface $58c_1$. The pushing force generated by surface $58c_1$ is primarily directed towards the center line to form ash layer 59b.

Figure 10A:
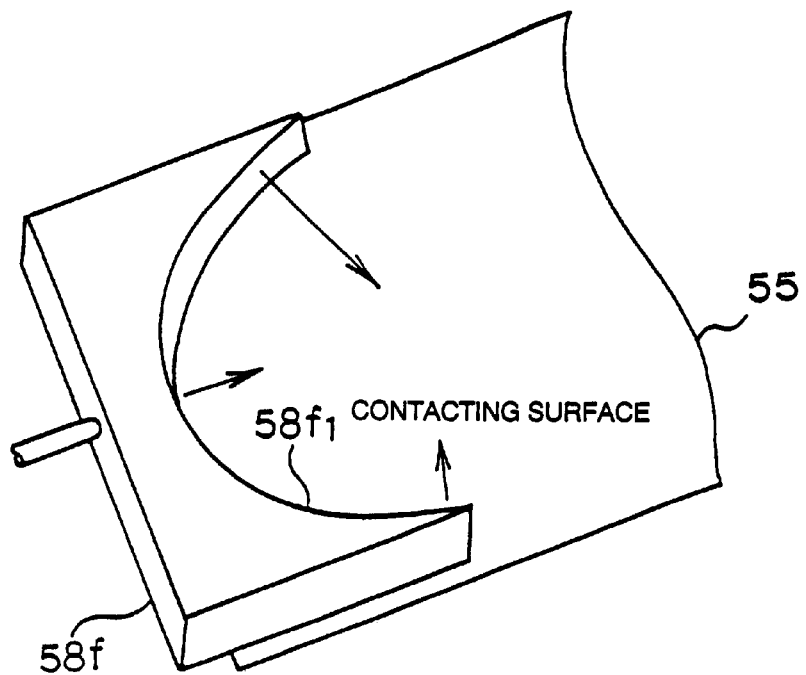
FIG. 10(A) shows a semicircular contacting surface.
Figure 10B:
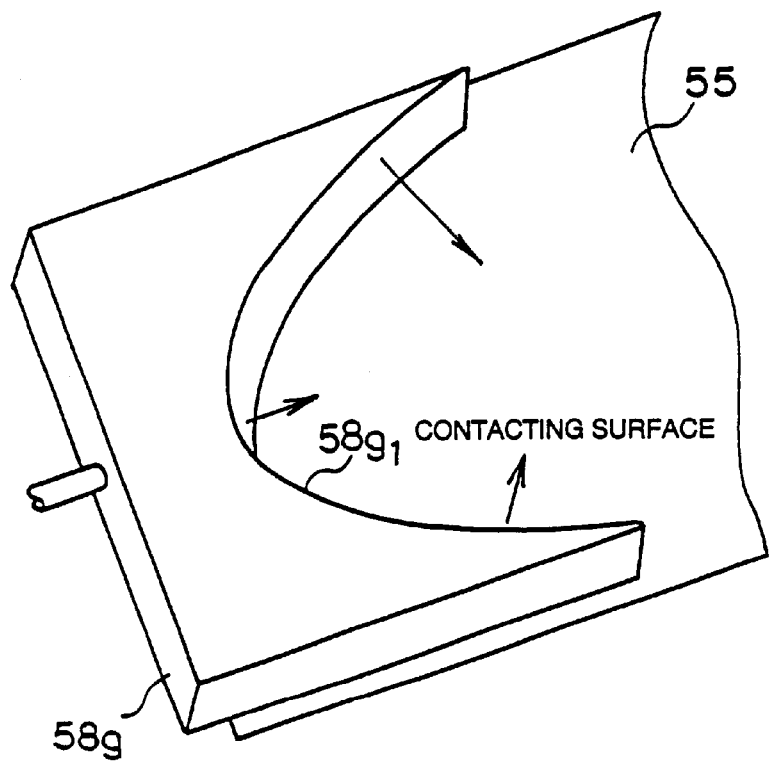
FIG. 10(B) shows a parabolic contacting surface.

Thus the ash can be directed towards the center of the region of radiant heat 35, which is on the center line of the furnace. The concave pushing surface may be semicircular, as shown in FIG. 10(A), or it may be parabolic, as shown in FIG. 10(B).

If its center is shaped like a pedestal and extends forward, and its sides are raked back at a steep angle, the advancing pusher will leave behind the ash on either side which is outside of the heated region containing the area covered by radiant heat from the burner in the center of the furnace. When the pusher advances, the ash in front of its central portion will be pushed forward, but the ash on either side of its backwardly inclined surfaces will be left behind. This design makes it possible to supply ash only to the center of the furnace.

Figure 9A:
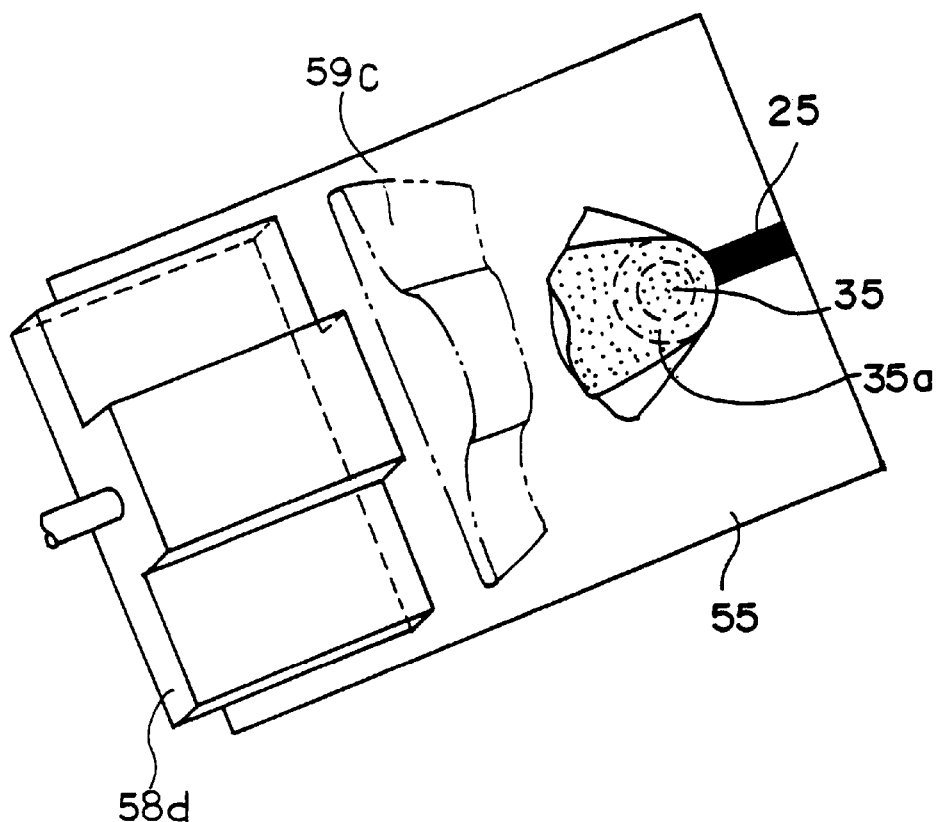
FIG. 9(A) is a diagram showing a form of a contacting surface of a pusher, and the movement of the ash layer according to yet another preferred embodiment of this invention.

FIG. 9(A) shows the shape of the pushing element in a pusher which is a third embodiment of pusher and the movement of the ash layer created by this pushing element.

As is shown in the embodiment, the pushing element 58d in the pusher of the third embodiment is formed of a material whose width is close to that of floor 55 and whose cross section protrudes upward in the center. This raised area in the center of the pusher supplies more ash than the lower portions on either side to create an ash layer 59 which is higher in the center. This design allows a sufficient quantity of ash to be supplied to heated region 35a, which receives a great deal of heat.

Figure 9B:
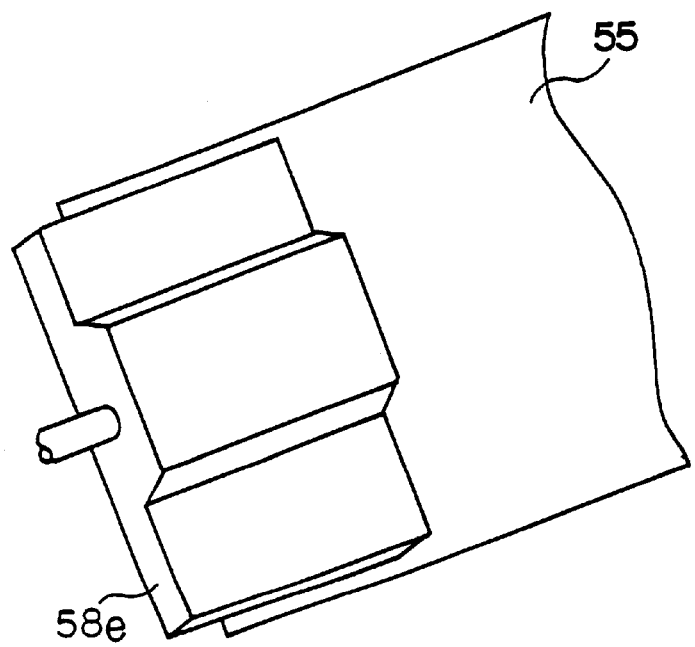
FIG. 9(B) is a modification of the embodiment shown in FIG. 9(A).

This pusher may also have a pushing element 58e as shown in FIG. 9(B), with a raised portion whose sides slope downward to form a gentler ash supply surface.

A pusher whose front end is configured as in this embodiment is quite different from pushers of the related art, which had a rectangular cross section and which pushed a uniform quantity of ash all across their width. The new design allows a larger quantity of ash to be pushed towards the center of the furnace. This maximizes the quantity of ash supplied to the center and minimizes the quantity supplied to either side.

If the end of the pusher has its sides furthest forward with the surface dropping away towards the center to form a concave pushing surface, the ash pushed by the pushing surface will be directed towards the center line which passes through the middle of the region of radiant heat. This design has the effect of maximizing the quantity of ash delivered to the center of the furnace and minimizing the quantity delivered to either side.

Figure 11:
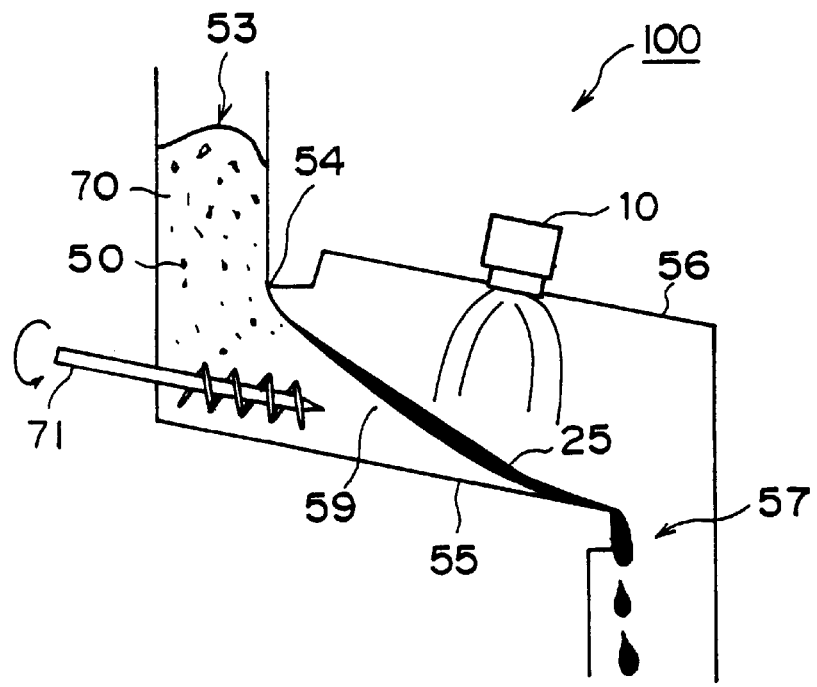
FIG. 11 is a rough block diagram of an ash-melting furnace according to a preferred embodiment of this invention which comprises a screw feeder.

The embodiments illustrated in FIG. 11 through FIG. 14 show ash-melting furnaces from which the drainage of molten ash is stable with little fluctuation. In the ash melting furnace 100, as can be seen in FIG. 11, the feeding means to feed the ash on the inlet side of the floor is not a pusher but a screw feeder 71 which can continuously feed the ash. Such screw feeders are provided in at least two places along the width of floor 55. They feed the ash along the inclined surface of floor 55.

The rotary speed of the screw feeders 71 can be varied to feed an appropriate quantity of ash with respect to the kind of ash being melted and its position in the furnace.

With this configuration, ash layer 59 will advance in a stable fashion, and its surface will receive a constant quantity of radiant heat from burner 10. This will produce a stable drainage of molten ash 25.

Figure 12:
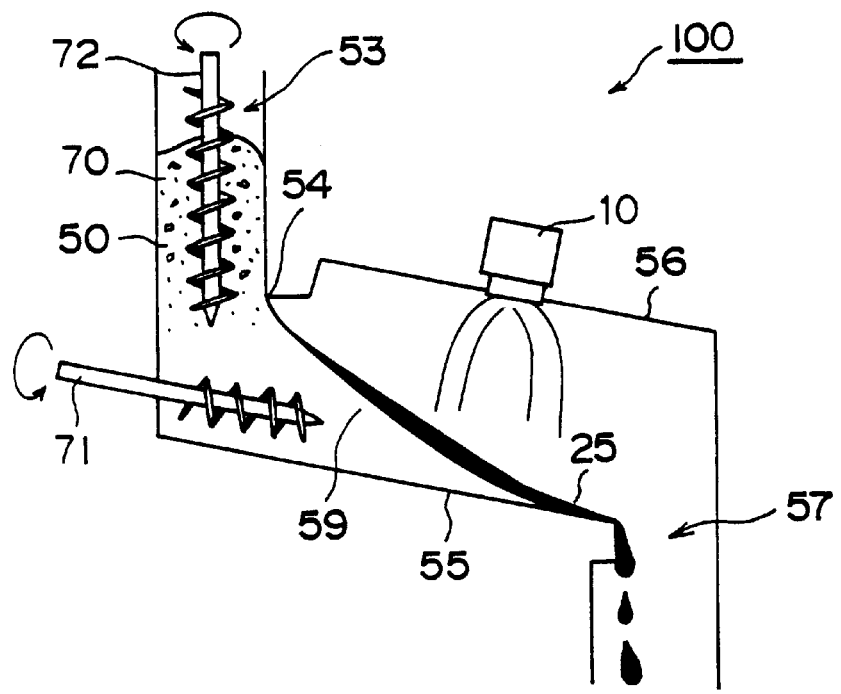
FIG. 12 is another rough block diagram of an ash-melting furnace according to another preferred embodiment of this invention which comprises a screw feeder.

FIG. 12 is a different embodiment from that shown in FIG. 11. The ash-melting furnace 100 in FIG. 12 has, in addition to screw feeders 71, the feeding means to continuously feed ash along floor 55, a second set of continuous feed devices, screw feeders 72, in the ash supply unit 53.

In other words, in addition to the screw feeders 71 which are oriented lengthwise along the floor 55 from the inlet, this embodiment has several screw feeders 72, which are oriented vertically above the inlet. There are more than one of each type of screw feeder. Screw feeders 71 are arranged in a row across the width of the floor, and screw feeders 72 are arranged in a row across the width of the stack. These feeders make it possible to supply ash 50 continuously to the highest part of the floor and to advance the ash 50 continuously along floor 55 towards discharge port 57.

Screw feeders 71 and 72 may have adjustable speed of rotation, or a helical ribbon screw feeder may be used as feeder 72.

With this sort of configuration, the cross-linkages which gradually developed in the ash which was gravity-fed from stack 70 to the floor of related art furnaces do not occur. A constant, uniform supply of ash is delivered to the inlet of the furnace, creating a stable moving layer of ash 59. The surface of this layer receives a constant quantity of radiant heat from burner 10, enabling molten ash 25 to drain in a stable fashion.

Figure 13:
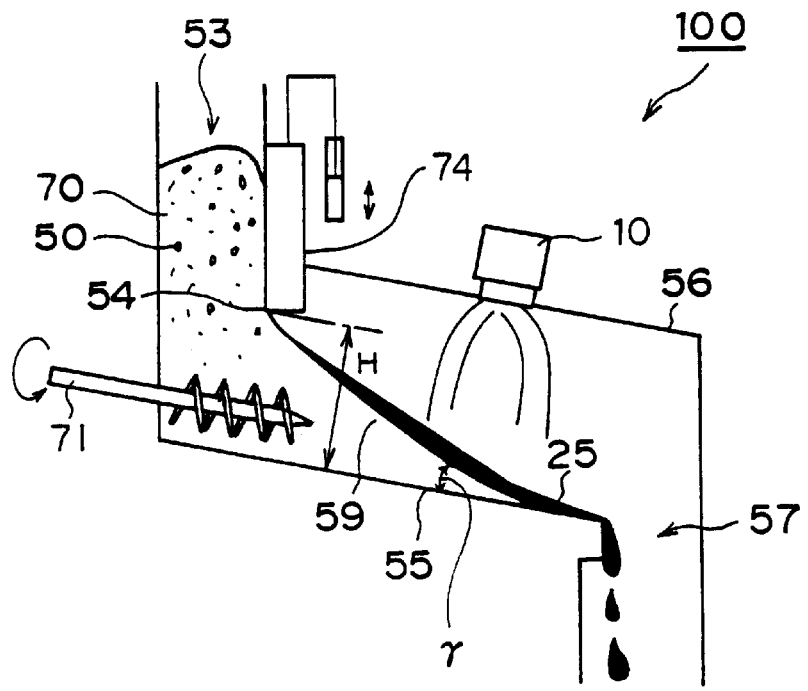
FIG. 13 is a rough block diagram of an ash-melting furnace according to a preferred embodiment of this invention which comprises a screw feeder and a gate.

Like the embodiment in FIG. 11, the embodiment in FIG. 13 has as its feeding means to feed ash a screw feeder 71 which can continuously feed the ash longitudinally down the floor from the inlet of the furnace. In addition, it has a gate 74 at the supply port 54 which can be raised or lowered to adjust the height H at which the supply of ash is cut off. The lowest position of gate 74 must be one which will not allow it to interfere with the operation of screw feeder 71.

With the above configuration, using screw feeder 71 as the feeding means to continuously feed ash 50 along floor 55 creates a stable ash layer 59. Using the screw feeder together with a gate 74 on supply port 54 to adjust the height H at which supply unit 53 is partitioned allows the angle of repose γ of the ash layer to be adjusted by the gate 74. Then even though different types of ash may be melted, a stable moving layer of ash 59 can still be created, and a stable drainage of molten ash 25 can be effected.

Figure 14:
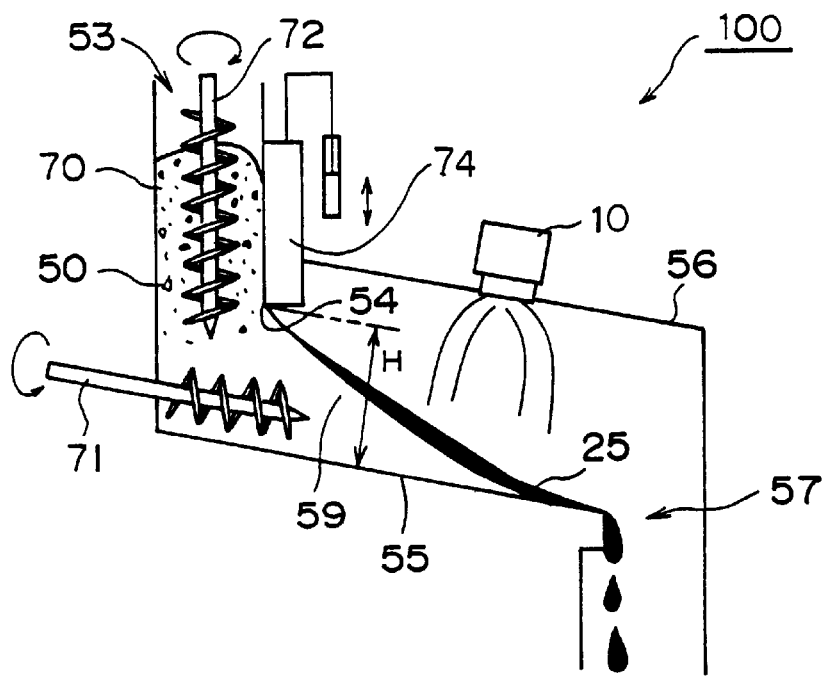
FIG. 14 is a rough block diagram of an ash-melting furnace according to a preferred embodiment of this invention which comprises a plurality of screw feeders and a gate.

FIG. 14 shows another embodiment of the device pictured in FIG. 13. This furnace has a screw feeder 71 running along the floor 55 and a vertical gate 74 which can be raised and lowered to adjust the height H at which supply unit 53 is partitioned. In addition, it has a vertical screw feeder 72 in the supply unit 53.

In addition to the effects of the configuration shown above in FIG. 13, this configuration has the effect of preventing cross-linkages from occurring in stack 70 and assuring a smooth supply of ash 50 to floor 55.

With this embodiment, the ash delivered via the supply port onto the floor of the furnace is continuously pushed forward along the floor by the feeding device. Thus the layer of ash created on the inclined surface of the floor will travel forward in a stable fashion without experiencing undulation. It will be in a uniform state, and its surface will receive a constant quantity of radiant heat from burner 10. This will produce a stable drainage of molten ash 25. Because the feeding device is a screw feeder, the ash can be supplied continuously or in varying amounts. This allows the system to respond effectively to load fluctuations due to the type and condition of the ash used.

Screw feeders are provided to supply the ash both from the supply port to the near end of the furnace floor and from there down the floor to the far end. These feeders allow the quantity of ash supplied to be varied across the width of the furnace. More specifically, they allow heating disparities across the width of the furnace which are due to the position of the burner to be addressed by increasing or decreasing the quantity of ash being fed. This allows the state of melting to be equalized across the furnace.

A feeding means to continuously feed the ash along the floor will create a stable ash layer. If a gate is also provided at the supply port to change the height of the partition which forms the supply unit, it can be used to control the angle of repose of the ash layer. This will assure a stable drainage even when ash of different types is being melted.

FIG. 15 through FIG. 18 show a number of embodiments of an ash-melting furnace in which primary and fly ash are combined before they are melted.

Figure 15:
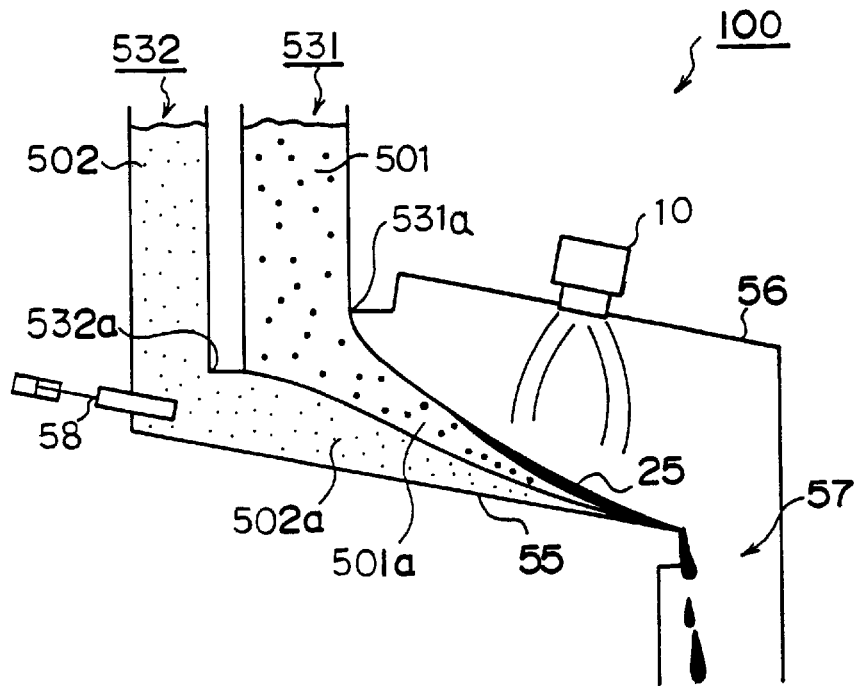
FIG. 15 is an ash-melting furnace for mixing and melting the primary ash and fly ash according to a preferred embodiment of this invention.

As can be seen in FIG. 15, the ash-melting furnace 100 of this embodiment comprises primary ash supply unit 531, which includes supply port 531a, an inlet on the near end of the furnace body above inclined floor 55; fly ash supply unit 531, which includes a supply port 532a just behind port 531a; pusher 58, the feeding means to feed the ash, which travels along floor 55 below supply port 532a; discharge port 57, the outlet for molten ash 25 on the far end of the furnace body; and burner 10, which is installed on ceiling 56 of the furnace body.

With the configuration described above, fly ash 502 and primary ash 501 are supplied separately via two supply ports which are placed one in front of the other. Fly ash 502 falls naturally to the inlet to floor 55 and is fed along the floor by pusher 58 to form fly ash layer 502a. As the layer 502a is formed, the primary ash 501 which is above it falls naturally from supply port 531a. As fly ash layer 502a flows forward, primary ash layer 501a is formed on top of it. The two layers move together towards the far end of floor 55.

As the combined layer of ash travels towards the far end of floor 55, the radiant heat from the flame of burner 10 heats and melts the surface of primary ash 501 in layer 501a. The fly ash 502 in the lower layer is not exposed directly to the flame of burner 10, nor is it conveyed upward by the combustion gases. Rather, it is heated and melted by the heat conductively transferred from primary ash 501 and by the heat directly transferred from molten ash 25.

Primary ash 501 and fly ash 502 are heated together until they form molten ash 25. They pass through discharge port 57 as slugs, drip onto a water-sealing conveyor below the port, and are discharged to the exterior.

With the configuration described above, the surface of primary ash layer 501a in the vicinity of supply port 531a will experience sintering from the radiant heat of the flame of burner 10. A crusher (not shown) may be provided which can move up and down to break up this sintered layer.

Figure 16:
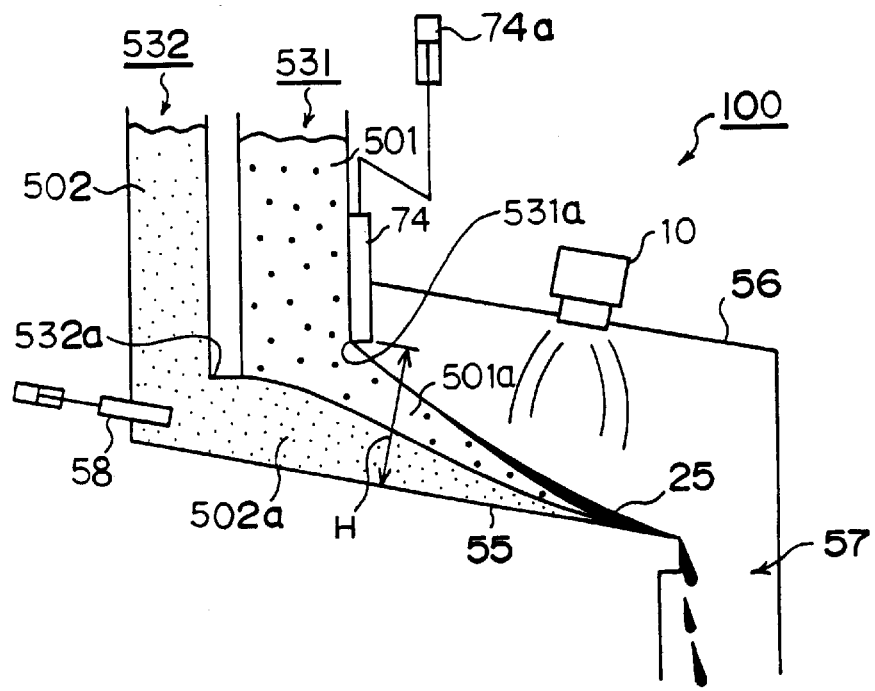
FIG. 16 is a rough block diagram of an ash-melting furnace as shown in FIG. 15 but which has a gate at the supply port for the primary ash according to another preferred embodiment of this invention.

The device shown in FIG. 16 is a variant of the embodiment in FIG. 15. A gate is provided on the supply port for the primary ash in the furnace shown in FIG. 15 which can adjust the angle of repose of the primary ash and the mixture of the primary and fly ash.

As can be seen in FIG. 16, the ash-melting furnace 100 of this embodiment comprises primary ash supply unit 531, which includes supply port 531a, an inlet on the near end of the furnace body above inclined floor 55; fly ash supply unit 531, which includes a supply port 532a just behind port 531a; pusher 58, the feeding means to feed the ash, which travels along floor 55 below supply port 532a; discharge port 57, the outlet for molten ash 25 on the far end of the furnace body; burner 10, which is installed on ceiling 56 of the furnace body; and gate 74, which can be raised or lowered to adjust the height H of the partition on the primary ash supply port 531a.

Such a vertical gate 74, which is interlocked with pusher 58, can be raised or lowered via mechanism 74a to adjust the height H of the partition which admits primary ash 501 when different types of ash are to be melted. This allows the proportions of the primary ash 501 and fly ash 502 to be adjusted when layers 501a and 502a are combined. It also allows the leading end of primary ash layer 501a to end up an appropriate distance from the discharge port 57 so that a stable flow of molten ash 25 will drain from the port.

In this embodiment, a layer of primary ash 501a which is optimal for melting can be formed by adjusting the layer in response to a change in its angle of repose. This is done by adjusting gate 74 so that the height H of the partition admitting primary ash 501 is set at the appropriate level, and it optimizes the proportions of primary ash 501 and fly ash 502 in the mixture. In this way the primary and fly ash can be melted together to produce a stable molten ash and a stable drainage.

Figure 17:
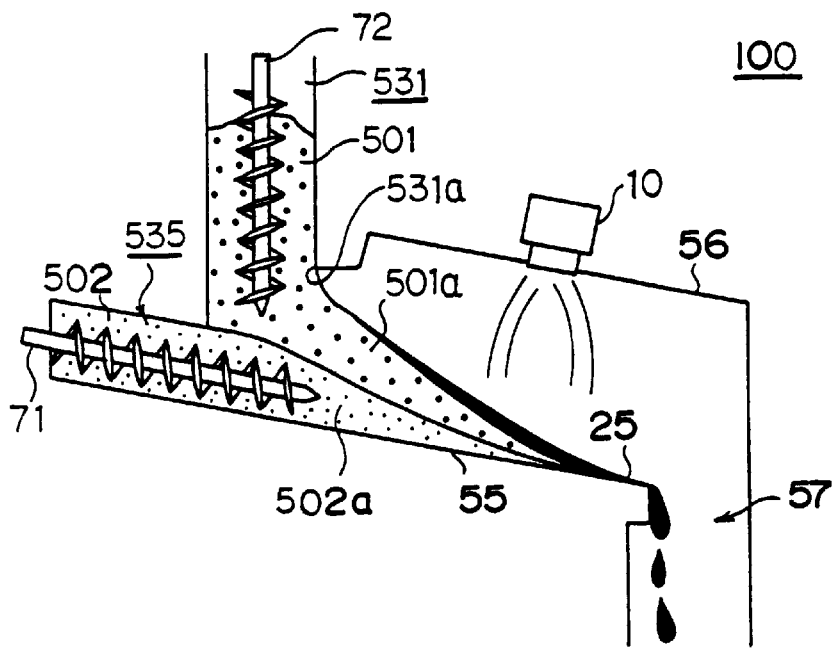
FIG. 17 is a rough block diagram of an ash-melting furnace which has screw feeders for the primary ash and the fly ash, respectively, according to another preferred embodiment of this invention.

FIG. 17 shows another embodiment in which screw feeders are provided to supply both the primary and fly ash.

As can be seen in FIG. 17, an adjustable-speed screw feeder 72 is positioned vertically along the path by which the primary ash is supplied in supply unit 531. Another adjustable-speed screw feeder 71 is oriented longitudinally in supply unit 535 along the inclined surface of floor 55 on the inlet side of the furnace.

With the configuration described above, fly ash 502 and primary ash 501 are supplied via two separate supply units, 531 and 535, and they are fed into the furnace by screw feeders 72 and 71. The fly ash 502 is fed along floor 55 by screw feeder 71 to form fly ash layer 502a. As layer 502a is formed, the primary ash 501 above it is fed into the furnace from supply unit 531 by screw feeder 72 to form primary ash layer 501a on top of the moving layer of fly ash 502a. Thus a two-tiered layer of ash is formed on floor 55 and in that state transported to the far end of floor 55.

As the combined layer of ash which is described above travels towards the far end of floor 55, the radiant heat from the flame of burner 10 heats and melts the surface of primary ash 501 in layer 501a. The fly ash 502 in the lower layer is not exposed directly to the flame of burner 10, nor is it conveyed upward by the combustion gases. Rather, it is heated and melted by the heat conductively transferred from primary ash 501 and by the heat directly transferred from molten ash 25, just as in the previous embodiment.

In this embodiment, adjustable-speed screw feeders 72 and 71 are provided in supply units 531 and 535, respectively. The rotary speed of these screw feeders can be adjusted to provide a continuous supply of ash. This will allow a stable layer of ash to form and assure a stable melting process. It also allows the amounts of primary and fly ash to be easily adjusted.

Figure 18:
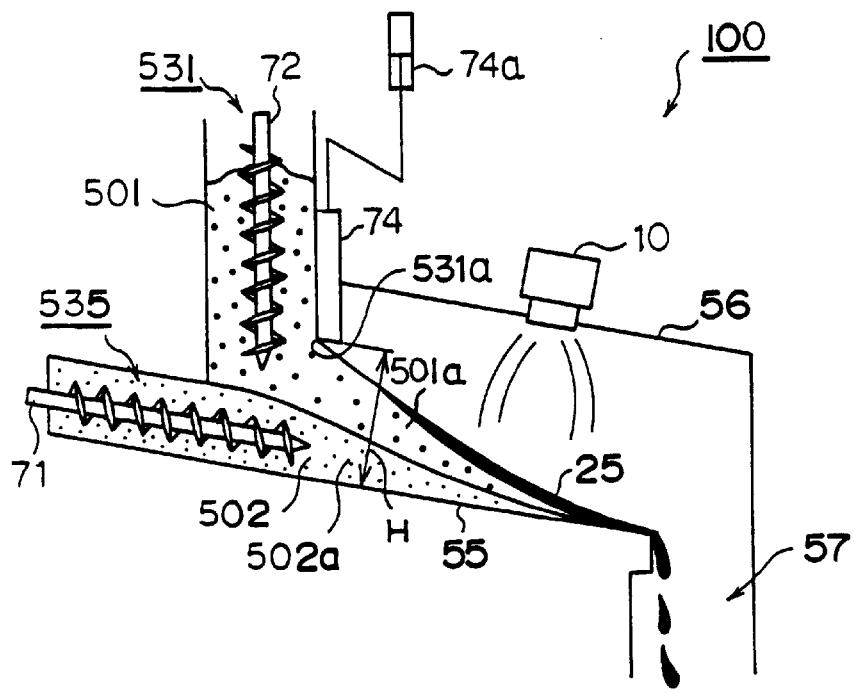
FIG. 18 is a rough block diagram of an ash-melting furnace as shown in FIG. 17 but which has a gate for the primary ash according to another preferred embodiment of this invention.
Figure 19:
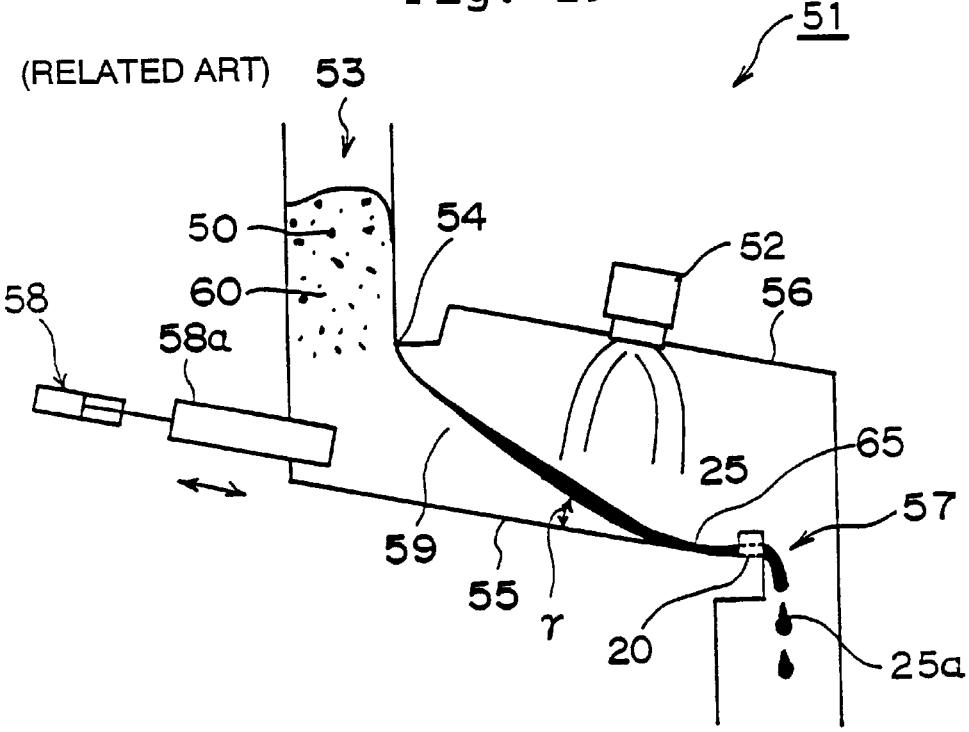
FIG. 19 is a rough block diagram of an ash-melting furnace according to the related art.
Figure 20:
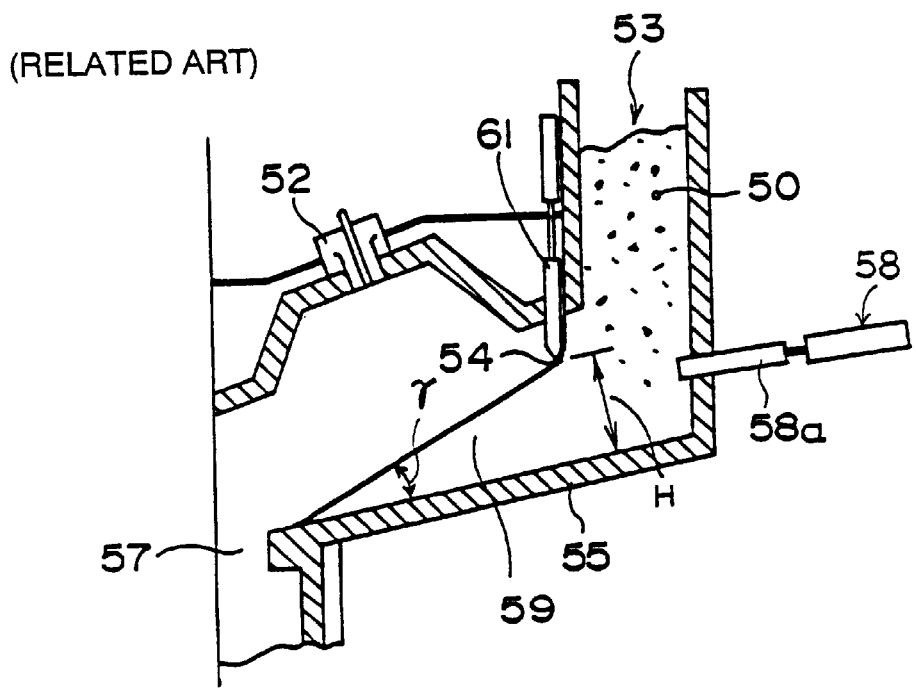
FIG. 20 is another rough block diagram of an ash-melting furnace which has a gate at the ash supply port according to the related art.
Figure 21:
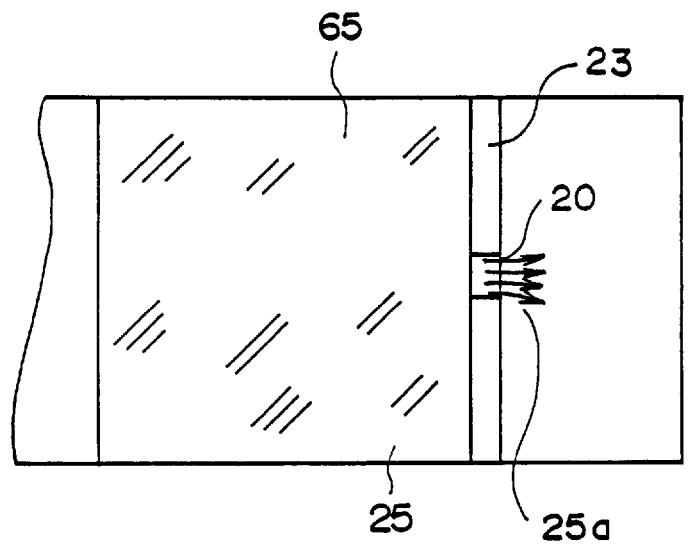
FIG. 21 is a plan view rough block diagram of an ash-melting furnace which has a dike at a slug reservoir and a drain port according to the related art.
Figure 22A:
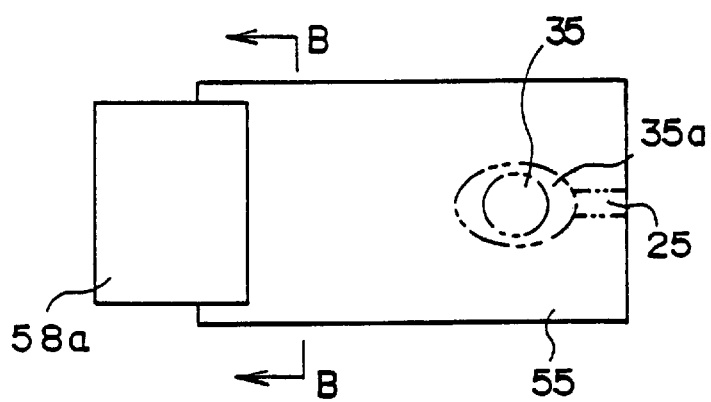
FIG. 22(A) is a plan view rough block diagram of the pusher.
Figure 22B:
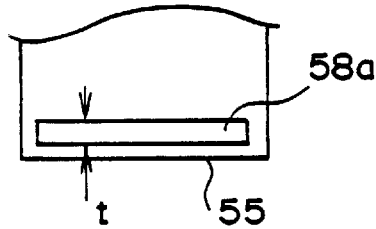
FIG. 22(B) is a cross section taken along line B—B.

FIG. 18 shows the configuration of a fourth preferred embodiment of this invention. Here a gate to adjust the angle of repose of the ash and alter the proportions in which the primary and fly ash are combined is added to the previous embodiment in which screw feeders are provided in the supply units for both the primary and fly ash.

As can be seen in the drawing, an adjustable-speed screw feeder 72 is positioned vertically in the supply unit 531. Another adjustable-speed screw feeder 71 is provided along the inclined surface of floor 55 in the supply unit 535. A vertical gate 74 which can be raised and lowered is provided in supply unit 531a to adjust the height H at which the supply unit is partitioned.

With this configuration, a two-tiered layer of ash is formed on floor 55 with fly ash 502 on the bottom and primary ash 501 on top. Since the method by which this two-tiered layer is transported intact to the far end of floor 55 is the same as that employed in the third embodiment, a detailed discussion of it is unnecessary. In this embodiment, the gate 74, which is interlocked with screw feeders 72 and 71, can be adjusted via mechanism 74a to change the height H of the partition to respond to different types of primary ash 501. This also adjusts the proportion in which the primary ash 501 and the fly ash 502 are supplied and allows the leading end of primary ash layer 501a to end up an appropriate distance from the discharge port 57 so that a stable flow of molten ash 25 will drain from the port. The speed of adjustable-speed screw feeders 72 and 71 in supply units 531 and 535 can be adjusted, and the height H of the partition on supply port 531a can be adjusted by gate 74, to easily control the amount of primary ash 501 and fly ash 502 supplied. Adjusting the angle of repose, the angle at which the ash is supplied, enables the furnace to respond to different types of ash.

With this embodiment, then, a lower layer of fly ash is formed with a layer of primary ash on top of it. This results in a two-tiered layer of ash in the furnace, with the fly ash completely covered by primary ash. The proportions of the two types of ash in this layer can easily be adjusted, so the minute particles of fly ash are not directly exposed to the exhaust gases from the burner. This eliminates the problem of the greater part of the fly ash escaping to the exterior with the exhaust gases.

Further, the fly ash is melted smoothly by the heat conductively transferred from the primary ash and by the heat directly transferred from the molten ash.

Since the inlet for the primary ash is placed further forward on the furnace, and the inlet for the fly ash is placed just behind it, the primary ash is deposited on top of the fly ash. A reliable two-tiered layer is formed in which the primary and fly ash are clearly segregated.

The inlet for the primary ash is oriented vertically above the near end of the floor of the furnace. That for the fly ash is oriented longitudinally along the inclined surface of the floor. Thus a layer of fly ash can be formed which has no irregularities to obstruct the flow of particles. Such a layer can flow steadily without experiencing undulations.

Because the primary ash, which consists of coarser particles, is deposited atop the fly ash, an upper layer flow is generated in the upper portion of the relatively smooth layer of fly ash on the floor of the furnace. This creates a well-defined two-tiered layer in which the primary and fly ash are clearly separated.

Because several screw feeders are provided in at least one location, the inlet for the fly ash, as the feeding means to feed the ash into the furnace, the amount of fly ash in the two-tiered flow can be adjusted to provide an appropriate proportion of primary to fly ash. This allows the supply of an amount of fly ash such that the primary ash enclosing the fly ash will reliably melt.

Because a gate is provided to adjust the height of the partition which determines the quantity of ash to be supplied to the inlet for the primary ash, it is easy to adjust the proportions of primary and fly ash in the mixture. By adjusting the angle of repose for each type of primary ash, the operator can assure that the leading end of the layer of primary ash ends up an appropriate distance from the discharge port. This will result in a stable flow of molten ash consisting of primary and fly ash.

The invention according to claims 1 and 2 provides an ash-melting furnace which can counteract fluctuations in the load and so allow the slugs to drain in a stable fashion. It also can control the heating by the burner in accordance with the discharging state of the slugs.

The invention according to claims 3 through 5 provides an ash-melting furnace which can enhance the efficiency of discharging the molten slugs. This invention can efficiently discharge specially the molten slugs which are collected in slug reservoir being formed from the molten ash, and so enhance the discharging speed of the molten slugs.

The invention according to claims 6 through 8 discloses a unique form of the pushing element of the pusher which can push the ash along the floor towards the discharge port forming the ash layer. This pusher can efficiently minimize pushing of the ash out of the heating region of the radiated flame including the radiant region, and thus minimize the unheated ash.

The invention according to claims 9 through 11 provides an ash-melting furnace which enables a continuous stable supply of ash from the supply port towards the discharge port to assure a stable outflow of molten ash with minimum fluctuation.

The invention according to claims 12 through 17 discloses an ash-melting furnace to melt the mixture of primary ash and fly ash. This ash-melting furnace can prevent the fly ash from dispersing in the atmosphere upon heating, and enable efficient melting of the fly ash with the primary ash.

What is claimed is:

1. An ash-melting furnace, comprising:

an ash supply port to supply ash provided at one end of said furnace;

a slug discharge port to discharge molten slugs of the ash at another end of said furnace;

an oxygen-enriched burner to melt the ash supplied from said ash supply port, the supplied ash being pushed forward along an inclined floor towards a drain port provided at a far end of said inclined floor to drain the molten slugs; a detector to detect or calculate a volume or a drain velocity of outflow of the molten slugs;

a comparator for comparing an output value from said detector with a preset value; and a controller to control either quantity of the ash supplied or quantity of heat produced by said oxygen-enriched burner in response to a signal from said comparator in order to make the outflow of the molten slugs stable and continuous.

2. An ash-melting furnace, comprising:

an ash supply port to supply ash provided at one end of said furnace;

a slug discharge port to discharge molten slugs of the ash at another end of said furnace;

an oxygen-enriched burner to melt the ash supplied from said ash supply port, the supplied ash being pushed forward along an inclined floor towards a drain port provided at a far end of said inclined floor to drain the molten slugs;

a combustion control device, comprising:

a monitor to monitor a volume or a drain velocity of outflow of the molten slugs at said drain port;

a calculator to calculate a control signal, based on a result from comparing said monitored volume or drain velocity with preset value, either for quantity of the ash supplied or quantity of heat produced by said oxygen-enriched burner; and a controller to control either the quantity of ash supplied or the quantity of heat produced by said oxygen-enriched burner in response to the control signal from said calculator.

3. An ash-melting furnace, comprising:

an ash supply port to supply ash provided at one end of said furnace;

a slug discharge port to discharge molten slugs of the ash at another end of said furnace;

an oxygen-enriched burner to melt the ash supplied from said ash supply port, the supplied ash being pushed forward along an inclined floor towards a drain port provided at a far end of said inclined floor to drain the molten slugs; and a guide wall on a dike for assuring fluidity of the molten slugs at said drain port, wherein said dike is continually straight or curved and width is gradually narrowed towards said drain port.

4. An ash-melting furnace according to claim 3, wherein said drain port is provided in a center of said dike, and a floor of a slug reservoir is recessed along an orthogonal direction of slug flow, which slopes gradually downward from upstream to downstream.

5. An ash-melting furnace, comprising:

an ash supply port to supply ash provided at one end of said furnace;

a slug discharge port to discharge molten slugs of the ash at another end of said furnace; and a pusher to push the ash on an inclined floor supplied from said ash supply port towards a region covered by radiant heat from a burner for melting the ash, wherein said pusher has a pushing surface provided at an end thereof, and a shape of sides of said pushing surface is different from a shape of a central portion of said pushing surface in order to supply the ash efficiently to the region covered by the radiant heat of said burner, wherein the central portion of said pushing surface is higher than the sides of said pushing surface, or said central portion is formed flat and the sides have a backwardly inclined surface in order to supply the ash efficiently to the region covered by the radiant heat of said burner.

6. An ash-melting furnace, comprising:

an ash supply port to supply ash provided at one end of said furnace;

a slug discharge port to discharge molten slugs of the ash at another end of said furnace; and a pusher to push the ash on an inclined floor supplied from said ash supply port towards a region covered by radiant heat from a burner for melting the ash, wherein said pusher has a pushing surface provided at an end thereof, and a shape sides of said pushing surface is different from a shape of a central portion of said pushing surface in order to supply the ash efficiently to the region covered by the radiant heat of said burner, wherein the central portion of said pushing surface drops away towards a center of said pusher to form a concave pushing surface, so that said pushing surface is directed towards a center line which passes through a middle of the region of radiant heat.

7. An ash-melting furnace, comprising:

an ash supply port to supply ash provided at one end of said furnace;

a slug discharge port to discharge molten slugs of the ash at another end of said furnace;

a burner to melt the ash supplied from said ash supply port, the supplied ash being pushed forward along an inclined floor towards a drain port provided at a far end of said inclined floor to drain the molten slugs; and an ash feeder system to continuously feed the ash from said ash supply port along said inclined floor, said ash feeder system comprising a first ash feeder oriented lengthwise along said inclined floor from said ash supply port, and a second ash feeder oriented vertically above said ash supply port.

8. An ash-melting furnace, comprising:

an ash supply port to supply ash provided at one end of said furnace;

a slug discharge port to discharge molten slugs of the ash at another end of said furnace;

a burner to melt the ash supplied from said ash supply port, the supplied ash being pushed forward along an inclined floor towards a drain port provided at a far end of said inclined floor to drain the molten slugs;

an ash feeder to continuously feed the ash from said ash supply port along said inclined floor, said feeder being provided in said ash supply port; and an adjustable gate along a wall of said ash supply port for adjusting the height of a layer of said ash on said inclined floor.

9. An ash-melting furnace, comprising:

at least two ash supply ports to supply ash provided at an upper end of said furnace, the first ash supply port being used for supplying primary ash, the second ash supply port being used for supplying fly ash (ash containing minute particles), said primary and fly ash forming a two-tiered layer of ash on an inclined floor, said first and second ash supply ports being arranged in such a way that the fly ash forms a lower layer of said two-tiered layer, and the primary ash forms an upper layer on said lower layer of fly ash;

a slug discharge port-to discharge molten slugs of the ash at the other end of said furnace; and a burner to melt the fly and primary ash supplied from said at least two ash supply ports, the supplied ash being pushed forward along said inclined floor towards a drain port provided at a far end of said inclined floor to drain the molten slug.

10. An ash-melting furnace according to claim 9, wherein said first ash supply port used for supplying the primary ash is located at a downstream area of said furnace, and said second ash supply port used for supplying the fly ash is located at an upstream area of said furnace.

11. An ash-melting furnace according to claim 9, wherein said first ash supply port used for supplying the primary ash is located at an upper area above the floor of said furnace, and said second ash supply port used for supplying the fly ash is located at a lower area above the floor of said furnace.

12. An ash-melting furnace according to claim 9, further comprising an ash feeding means, such as a screw feeder, to feed the fly ash at an upstream area of said furnace, said ash feeding means being oriented lengthwise along said inclined floor from said ash supply port.

13. An ash-melting furnace according to claim 9, further comprising a gate along a wall of said ash supply port for adjusting the height of a layer of ash on said inclined floor.

14. An ash melting method to melt ash, comprising a step of:

supplying primary ash (ash containing rough particles) from an upper end of said furnace to form an upper layer of a two-tiered layer of ash;

supplying fly ash (ash containing minute particles) from the upper end of said furnace to form a lower layer of the two-tiered layer of ash;

moving the two-tiered layer together towards the far end of said furnace, and heating and melting said two-tiered layer by a burner to form molten slugs during said moving step; and discharging said molten slugs from a slug discharging port at the other end of the furnace.

* * * * *